(12) United States Patent
Shirakawa

(10) Patent No.: US 8,298,712 B2
(45) Date of Patent: Oct. 30, 2012

(54) FUEL CELL SYSTEM, AND CONTROL METHOD FOR FUEL CELL

(75) Inventor: Tsutomu Shirakawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 395 days.

(21) Appl. No.: 12/452,393

(22) PCT Filed: Jul. 16, 2008

(86) PCT No.: PCT/IB2008/001852
§ 371 (c)(1),
(2), (4) Date: Jan. 28, 2010

(87) PCT Pub. No.: WO2009/010857
PCT Pub. Date: Jan. 22, 2009

(65) Prior Publication Data
US 2010/0167143 A1    Jul. 1, 2010

(30) Foreign Application Priority Data
Jul. 18, 2007   (JP) ................................ 2007-186699

(51) Int. Cl.
*H01M 8/04* (2006.01)
(52) U.S. Cl. ..................................... 429/429
(58) Field of Classification Search .................. None
See application file for complete search history.

(56) References Cited

U.S. PATENT DOCUMENTS

| | | | |
|---|---|---|---|
| 2004/0219406 A1 | 11/2004 | Sugawara et al. | |
| 2004/0229088 A1* | 11/2004 | Hayashi et al. | ................. 429/13 |

FOREIGN PATENT DOCUMENTS

| | | |
|---|---|---|
| FR | 2 831 994 A1 | 5/2003 |
| JP | A-11-176454 | 7/1999 |
| JP | A-2000-243417 | 9/2000 |
| JP | A-2002-289237 | 10/2002 |
| JP | A-2002-373685 | 12/2002 |
| JP | A-2003-115314 | 4/2003 |
| JP | A-2003-317752 | 11/2003 |
| JP | A-2004-172026 | 6/2004 |
| JP | A-2004-185974 | 7/2004 |

(Continued)

OTHER PUBLICATIONS

Written Opinion of the International Searching Authority issued in International Application No. PCT/IB2008/001852 on Dec. 18, 2009.

(Continued)

*Primary Examiner* — Patrick Ryan
*Assistant Examiner* — Wyatt McConnell
(74) *Attorney, Agent, or Firm* — Oliff & Berridge, PLC

(57) ABSTRACT

At the time of start-up of a fuel cell, the anode and the cathode are supplied with a fuel gas containing hydrogen and an oxidant gas (e.g., air) containing oxygen and an impurity gas, respectively, and the output of the fuel cell is restricted (e.g., prohibited). After a difference between the partial pressure of the impurity gas in the anode and the partial pressure of the impurity gas in the cathode becomes less than a predetermined value, the restriction of the output of the fuel cell is lifted, and the output of the fuel cell is controlled according to the requested output.

17 Claims, 20 Drawing Sheets

FOREIGN PATENT DOCUMENTS

| | | |
|---|---|---|
| JP | A-2004-206948 | 7/2004 |
| JP | A-2004-213944 | 7/2004 |
| JP | A-2004-523064 | 7/2004 |
| JP | A-2005-203143 | 7/2005 |
| JP | A-2005-243476 | 9/2005 |
| JP | A-2006-202696 | 8/2006 |
| JP | A-2006-236862 | 9/2006 |
| JP | A-2007-026891 | 2/2007 |
| JP | A-2007-048538 | 2/2007 |
| WO | WO 02/058168 A2 | 7/2002 |

OTHER PUBLICATIONS

International Search Report issued in International Application No. PCT/IB2008/001852 on Dec. 18, 2009.
Notification of Reason(s) for Refusal, dated Apr. 26, 2012, for Japanese Patent Application No. 2007-186699 (with partial translation).
Notification of Reason(s) for Refusal, dated Jul. 27, 2010, for Japanese Patent Application No. 2004-005858 (with partial translation).

* cited by examiner

FIRST MODIFICATION OF FUEL GAS CHANNEL

SECOND MODIFICATION OF FUEL GAS CHANNEL

FOURTH MODIFICATION OF FUEL GAS CHANNEL

FUEL CELL SYSTEM, AND CONTROL METHOD FOR FUEL CELL

FIELD OF THE INVENTION

The invention relates to a fuel cell system, and a control method for a fuel cell provided in the fuel cell system.

BACKGROUND OF THE INVENTION

Fuel cells that generate electricity through the electrochemical reaction between a fuel gas (e.g., hydrogen) and an oxidant gas (e.g., oxygen) are drawing attention as an energy source. The fuel cell is provided with an electricity generation body (e.g., a membrane-electrode assembly) formed by joining an anode and a cathode to two opposite sides of an electrolyte membrane (e.g., a solid polymer membrane that has proton conductivity). The anode of the electricity generation body is supplied with the fuel gas from a fuel gas channel, and the cathode is supplied with the oxidant gas from an oxidant gas channel.

In the case where a membrane-electrode assembly formed by joining an anode and a cathode to two opposite surfaces of an electrolyte membrane that has proton conductivity is used as the aforementioned electricity generation body, the oxidant gas supplied to the cathode of the membrane-electrode assembly is generally an air-containing oxygen. In the case where air is used as the oxidant gas, an impurity gas that is contained in air and does not contribute to the electricity generation, such as nitrogen or the like, permeates through the electrolyte membrane from the cathode side to the anode side.

Since the permeation of the impurity gas from the cathode side to the anode side continues to occur even during a stop of electricity generation, the impurity gas fills the anode in the case the electricity generation is stopped for a long time. Then, in so-called anode dead-end type fuel cells in which substantially the entire amount of the fuel gas supplied to the anode is used for electricity generation while residing within the fuel cells without being discharged to the outside of the fuel cells, the discharge of the anode off-gas to the outside of the fuel cells is not performed. Therefore, in the anode dead-end type fuel cell, if the fuel gas is supplied to the anode at the time of start-up of the fuel cell, the impurity gas in the anode comes to locally reside in a downstream region in the flowing direction of the fuel gas due to the flow of the fuel gas. Then, in the case where the fuel cell in this state is connected to a load and is caused to generate electricity, the concentration of the fuel gas becomes lower in a region in the membrane-electrode assembly in which the impurity gas is residing than in a region therein in which the impurity gas is not residing. As a result, the distribution of electricity generation in the membrane-electrode assembly becomes non-uniform, bringing about a decline in the electricity generation efficiency.

Let it considered that a fuel cell system that includes fuel cells described above is mounted as a power source of an electric vehicle. In this case, if electricity is generated with the impurity gas residing in a portion of the anode and electric power is supplied to the load, the cell voltage can decline, affecting the operation of the vehicle (system).

In a fuel cell stack in which a plurality of membrane-electrode assemblies are stacked with separators disposed therebetween, if the concentration of the fuel gas declines in any one of the membrane-electrode assemblies, the electromotive force of that membrane-electrode assembly declines, so that a reverse voltage occurs between the anode and the cathode of the membrane-electrode assembly. Generally, the anodes and the cathodes of the membrane-electrode assemblies are each constructed of a catalyst layer and a gas diffusion layer. In many cases, a carbon supporting a catalyst metal is used in the catalyst layer. Therefore, if a reverse voltage occurs between the anode and the cathode of a membrane-electrode assembly, there arises a problem of the anode-side catalyst layer of that membrane-electrode assembly degrading due to oxidation of the carbon. This carbon oxidation is represented by equation (1).

$$C+2H_2O \rightarrow CO_2+4e^-+4H^+ \quad (1)$$

SUMMARY OF THE INVENTION

The invention provides a fuel cell system including an anode dead-end type fuel cell in which a problem caused by the local residence of an impurity gas in the anode of an electricity generation body at the time of start-up of the fuel cell is restrained, and a control method for the system.

A first aspect of the invention relates to a fuel cell system. This fuel cell system includes: a fuel cell that includes an electricity generation body formed by joining an anode to a surface of an electrolyte membrane and joining a cathode to another surface of the electrolyte membrane and that generates electricity while a fuel gas supplied to the anode is not discharged to outside but resides inside; a fuel gas supply portion that supplies the fuel gas to the anode; an oxidant gas supply portion that supplies an oxidant gas containing oxygen and an impurity gas other than oxygen, to the cathode; a cathode off-gas discharge portion that discharges a cathode off-gas that is an oxidant gas left unused for electricity generation in the cathode, to an outside of the fuel cell; a requested-output input portion that inputs a requested output that is requested by a load; and an output control portion that controls output of the fuel cell based on the input requested output. The output control portion controls the fuel gas supply portion, the oxidant gas supply portion and the cathode off-gas discharge portion based on the input requested output, and causes the fuel gas to be supplied to the anode, and causes the oxidant gas to be supplied to the cathode, and causes the cathode off-gas to be discharged from the cathode, and the output control portion restricts the output of the fuel cell to an output that is smaller than the requested output at a time of start-up of the fuel cell.

In the fuel cell system in accordance with the first aspect of the invention, at the time of start-up of the anode dead-end type fuel cell, the output of the fuel cell is restricted by the output control portion to an output that is smaller than the output requested by a load. Therefore, the above-described problem caused by the local residence of an impurity gas in the anode of an electricity generation body at the time of start-up of the fuel cell can be restrained. Besides, in the case where a membrane-electrode assembly is used as the electricity generation body, the restriction of the output of the fuel cell by the output control portion may be prohibition of the output of the fuel cell, in the light of prevention of the carbon oxidation of the catalyst layer of the anode of the membrane-electrode assembly.

The fuel cell system may further include an electric storage device, and, at the time of output restriction (the time of start-up) of the fuel cell, the output control portion may cause the electric storage device to supply the entire amount of the requested output that is requested by the load or the amount of electric power by which the amount of electric power that can be supplied from the fuel cell to the load falls short of the requested amount. With this construction, the fuel cell system can quickly supply electric power to the load. Besides, after the output restriction on the fuel cell is lifted, electric power generated by the fuel cell can be stored into the electric storage device.

Incidentally, "the requested output that is requested by a load" may mean "the requested output that the load requests of the fuel cell system", and "the requested output that is requested of the fuel cell" may include both "the requested output that is requested of the fuel cell" and "the requested output that is requested of the electric storage device (in the case where the electric storage device is provided in the fuel cell system)".

Herein, the anode dead-end operation means that electricity generation is continued while the fuel gas continues to be supplied to the anode side but is not discharged from the anode side. As a result, electricity generation is performed while substantially the entire amount of the fuel gas supplied at least at the time of steady electricity generation resides at the anode side. In the case where the electricity generation body includes a membrane-electrode assembly formed by joining an anode and a cathode to two opposite sides of an electrolyte membrane, and generates electricity as the fuel gas (mostly, hydrogen or a hydrogen-containing gas) is supplied to the anode side, substantially the entire amount of the fuel gas supplied to the anode is held inside and utilized for the electricity generation without being discharged to the outside. This concludes that the anode side supplied with the fuel gas generally has a closed structure that does not discharge or emit the fuel gas to the outside.

In this specification, the manner of operation in which substantially the total amount of fuel gas supplied to a fuel gas consumption layer (anode) is referred to as the dead-end operation. If there is added an arrangement in which the fuel gas is extracted from the fuel gas consumption layer, and is used without the intention of circulating the fuel gas from the fuel gas consumption layer, such a construction is not excluded from the dead-end operation. For example, a construction in which a channel for extracting a small amount of fuel gas from the fuel consumption layer or from upstream thereof is provided and the extracted fuel gas is burned for the pre-heating of an accessory or the like, etc., can be conceived. This consumption of the fuel gas is not within a construction that is excluded from the concept that "substantially the entire amount of the fuel gas is consumed in the fuel gas consumption layer" in this invention, if the fuel gas being extracted from the fuel gas consumption layer or from upstream thereof does not have a special meaning.

The fuel cell can also be grasped as a construction that realizes an operation state in which electricity is continuously generated in a balanced state in which the partial pressure of an impurity (e.g., nitrogen) in the anode electrode (hydrogen electrode) is in balance with the partial pressure of the impurity (e.g., nitrogen) in the cathode electrode (air electrode). The "balanced state" herein means, for example, an equilibrium state, and does not necessarily mean a state in which the two partial pressures are equal.

The fuel cell system may further include a determination portion that determines whether or not a difference between a partial pressure of the impurity gas in the anode and a partial pressure of the impurity gas in the cathode is less than a predetermined value. If at a predetermined timing after the start-up of the fuel cell, it is determined by the determination portion that the difference between the partial pressure of the impurity gas in the anode and the partial pressure of the impurity gas in the cathode is less than the predetermined value, the output control portion may control the output of the fuel cell according to the input requested output.

The difference between the partial pressure of the impurity gas in the anode and the partial pressure of the impurity gas in the cathode being less than the predetermined value may include the partial pressures being in an equilibrium state.

After the anode dead-end type fuel cell is started up, that is, after the fuel gas starts to be supplied to the anode of the electricity generation body, impurity gas having locally resided in a portion of the anode permeates through the electrolyte membrane to the cathode side due to the concentration gradient or the pressure of fuel gas supplied, as time elapses. Therefore, the partial pressure of the impurity gas in the anode and the partial pressure of the impurity gas in the cathode approach an equilibrium state. That is, the partial pressure of the fuel gas in the anode and the partial pressure of oxygen in the cathode approach an equilibrium.

In the fuel cell system, when it is determined by the determination portion that the difference between the partial pressure of the impurity gas in the anode and the partial pressure of the impurity gas in the cathode is less than the predetermined value, that is, it is determined that the partial pressure of the impurity gas in the anode and the partial pressure of the impurity gas in the cathode have approached an equilibrium state, the output control portion lifts the output restriction on the fuel cell, and controls the output of the fuel cell according to the requested output. Therefore, the foregoing problem can be restrained, and the output from the fuel cell according to the requested output can be started.

The fuel cell system may further include an operation condition input portion that inputs an operation condition of the fuel cell that includes a condition of supply of the fuel gas at the time of start-up of the fuel cell; a table storage portion that stores a table in which a correspondence relation between the operation condition and a time that elapse from the startup of the fuel cell until the difference between the partial pressure of the impurity gas in the anode and the partial pressure of the impurity gas in the cathode becomes less than the predetermined value; and a time that measures an elapsed time following the start-up of the fuel cell. The determination portion may determine whether or not the difference between the partial pressure of the impurity gas in the anode and the partial pressure of the impurity gas in the cathode is less than the predetermined value by setting the time that elapses until the difference between the partial pressure of the impurity gas in the anode and the partial pressure of the impurity gas in the cathode becomes less than the predetermined value, and by referring to the timer.

The determination portion referring to the timer may include comparing the elapsed time measured by the timer and the time that elapses until the difference between the partial pressures becomes less than the predetermined value.

The time that elapses from the start-up of the anode dead-end type fuel cell until the difference between the partial pressure of the impurity gas in the anode and the partial pressure of the impurity gas in the cathode becomes less than the predetermined value, that is, the time that elapses until the output restriction on the fuel cell is lifted, is related to the operation condition of the fuel cell that includes the start-up-time operation condition of the fuel cell. The correspondence relation therebetween can be empirically or analytically known beforehand.

In the foregoing fuel cell system, the output restriction on the fuel cell can be lifted by setting the time that elapses until the difference between the partial pressure of the impurity gas in the anode and the partial pressure of the impurity gas in the cathode becomes less than the predetermined value, on the basis of the aforementioned table, and by referring to the aforementioned timer.

In the fuel cell system, the condition of supply of the fuel gas may include at least one of pressure of the fuel gas supplied and temperature of the electricity generation body. Besides, the fuel cell system may further include at least one of a pressure sensor that detects the pressure of the fuel gas supplied and a temperature sensor that detects the temperature of the electricity generation body.

The time that elapses from the start-up of the anode dead-end type fuel cell until the difference between the partial pressure of the impurity gas in the anode and the partial pressure of the impurity gas in the cathode becomes less than the predetermined value changes according to the pressure of the fuel gas supplied, the temperature of the electricity generation body, etc.

In the fuel cell system, the time that elapses until the difference between the partial pressure of the impurity gas in the anode and the partial pressure of the impurity gas in the cathode becomes less than the predetermined value can be set on the basis of the table and at least one of the pressure of the fuel gas supplied and the temperature of the electricity generation body.

In the foregoing fuel cell system, the operation condition may further include an electricity generation stop duration of the fuel cell, and the timer may further measure the electricity generation stop duration, and the determination portion may set the time that elapses until the difference between the partial pressure of the impurity gas in the anode and the partial pressure of the impurity gas in the cathode becomes less than the predetermined value, by taking into account the electricity generation stop duration measured by the timer.

For example, in the case where the fuel cell system is mounted in an electric vehicle as an electric power source for driving an electric motor, the load changes at all times during running (including red-light stops and relatively short-time stops), so that in the fuel cell system, controls of performing the electricity generation of the fuel cell and stopping the electricity generation or the like are performed. During a relatively short-time stop of electricity generation, the above-described permeation of the impurity gas occurs, but is small in amount in comparison with during a relatively long-time stop of electricity generation.

In the foregoing fuel cell system, since the electricity generation stop duration of the fuel cell can be taken into account to set the time that elapses until the difference between the partial pressure of the impurity gas in the anode and the partial pressure of the impurity gas in the cathode becomes less than the predetermined value, the time until the output restriction on the fuel cell is lifted can be more specifically set.

The fuel cell system may further include a concentration sensor that detects concentration of the impurity gas or the fuel gas in the anode. The determination portion may determine whether or not the difference between the partial pressure of the impurity gas in the anode and the partial pressure of the impurity gas in the cathode is less than the predetermined value based on the concentration of the impurity gas or the fuel gas detected by the concentration sensor.

In the fuel cell, the concentration of the impurity gas or the fuel gas can be directly detected by the concentration sensor, and it can be determined whether or not it is allowable to lift the output restriction on the fuel cell.

The concentration sensor may be provided in a region in which the impurity gas is likely to reside at the time of start-up of the fuel cell.

The concentration sensor may be provided in a downstream region in the anode that is in a flowing direction of the fuel gas.

The fuel cell system may further include a voltage detection portion that detects voltage between the anode and the cathode. The determination portion may determine whether or not the difference between the partial pressure of the impurity gas in the anode and the partial pressure of the impurity gas in the cathode is less than the predetermined value based on the voltage detected by the voltage detection portion.

In the case where the impurity gas is locally residing in the fuel cell, the voltage between the anode and the cathode (so-called cell voltage) is lower than in the case where the impurity gas is not locally residing.

In the foregoing fuel cell system, it can be determined whether or not it is permissible to lift the output restriction on the fuel cell based on the voltage detected by the voltage detection portion (so-called cell voltage) based on the voltage (so-called cell voltage) detected by the voltage detection portion.

A second aspect of the invention relates to a fuel cell system. This fuel cell system includes a fuel cell that includes an electricity generation body formed by joining an anode to a surface of an electrolyte membrane and joining a cathode to another surface of the electrolyte membrane and that generates electricity while a fuel gas supplied to the anode is not discharged to outside but resides inside; a fuel gas supply portion that supplies the fuel gas to the anode; and an output control portion that, at a time of start-up of the fuel cell, controls output of the fuel cell after the fuel gas starts to be supplied from the fuel gas supply portion and until a predetermined condition is satisfied.

In the fuel cell system in accordance with the second aspect of the invention, the output of the fuel cell is restricted at the time of start-up of the fuel cell, independently of the requested output that is requested from a load, unlike in the foregoing fuel cell system in accordance with the first aspect of the invention. The construction of the second aspect is also able to restrain the above-described problem caused by the local residence of an impurity gas in the anode of an electricity generation body at the time of start-up of the fuel cell.

Incidentally, it is permissible to adopt a construction in which an oxidant gas is supplied to the cathode at the time of start-up of the fuel cell or a construction in which an oxidant gas is not supplied thereto. Besides, the amount of the fuel gas supplied to the anode at the time of start-up of the fuel cell can be arbitrarily set. Besides, examples of the "predetermined condition" in this aspect include various conditions such as conditions regarding the difference between the partial pressures of the impurity gas in the anode and the cathode, the time from the start of supply of the fuel gas, the electricity generation stop duration, the concentration of the impurity gas or the fuel gas in the anode, the cell voltage, etc.

In the fuel cell system in accordance with the aspects of the invention, at the time of start-up of the fuel cell, supply of the fuel gas to the anode may be performed prior to supply of the oxidant gas to the cathode.

A third aspect of the invention relates to a control method for a fuel cell system. The fuel cell system includes a cell that includes an electricity generation body formed by joining an anode to a surface of an electrolyte membrane and joining a cathode to another surface of the electrolyte membrane and that generates electricity while a fuel gas supplied to the anode is not discharged to outside but resides inside. The control method includes: acquiring an requested output that is requested of the fuel cell; and supplying the fuel gas to the anode and supplying an oxidant gas containing oxygen and an impurity gas other than oxygen, to the cathode based on the acquired requested output, and discharging a cathode off-gas that is an oxidant gas not having been used for electricity generation in the cathode, from the cathode to an outside of the fuel cell, and controlling the output of the fuel cell. Controlling the output of the fuel cell includes restricting the output of the fuel cell to an output that is smaller than the requested output, at the time of start-up of the fuel cell.

A fourth aspect of the invention relates to a control method for a fuel cell system. The fuel cell system includes a cell that includes an electricity generation body formed by joining an anode to a surface of an electrolyte membrane and joining a cathode to another surface of the electrolyte membrane and that generates electricity while a fuel gas supplied to the anode is not discharged to outside but resides inside. The control method includes: supplying the fuel gas to the anode at a time of start-up of the fuel cell; and restricting the output of the fuel cell after the fuel gas starts to be supplied and until a predetermined condition is satisfied.

The invention does not need to include all the foregoing various features, but one or more of them may be omitted or combined to provide a construction according to the invention. The invention may be constructed as a control method for a fuel cell system, besides a fuel cell system as described above. The invention can be realized in various forms such as a computer program that realizes features described above, a recording medium that records the program, a data signal that includes the program and that is embodied in a carrier wave, etc. In addition, in each of the forms, various additional features described above can be applied.

In the case where the invention is constructed as a computer program, a recording medium that records the program, etc., the invention may be constructed as a whole program that controls the operation of the fuel cell system, or may also be constructed as a portion of a program which performs a function of the invention. Besides, the recording medium utilized in the invention may be any of various recording media that can be read by a computer, including a flexible disk, a CD-ROM, a DVD-ROM, a magneto-optical disk, an IC card, a ROM cartridge, a punch card, a print in which a code, such as a bar code or the like, is printed, an internal storage device of a computer (a memory such as a RAM, a ROM, etc.), an external storage device, etc.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
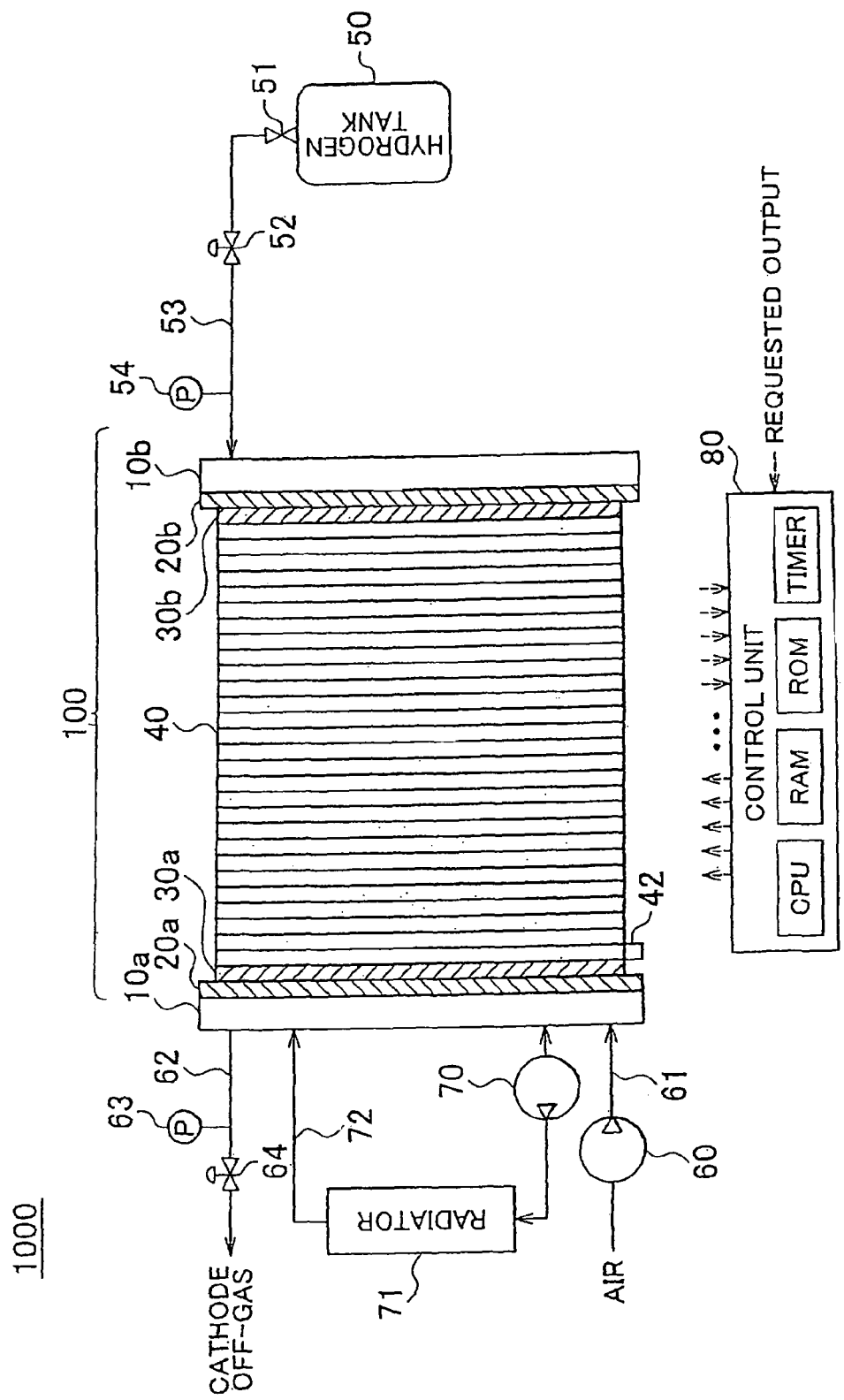
FIG. 1 is an illustrative diagram showing a general construction of a fuel cell system 1000 of a first embodiment of the invention.

A fuel cell system 1000 of a first embodiment of the invention will be described. FIG. 1 is an illustrative diagram showing a general construction of the fuel cell system 1000 of the first embodiment of the invention. The fuel cell system 1000 of this embodiment is mounted as an electric power source in an electric vehicle that is driven by an electric motor.

A fuel cell stack 100 has a stack structure in which a plurality of fuel cell units 40 that generate electricity by the electrochemical reaction between hydrogen and oxygen. Each fuel cell unit 40 is generally constructed by sandwiching between separators a membrane-electrode assembly formed by joining an anode and a cathode to two opposite sides of an electrolyte membrane that has proton conductivity. In the membrane-electrode assembly, each of the anode and the cathode has a catalyst layer that is joined to the adjacent surface of the electrolyte membrane, and a gas diffusion layer joined to the surface of the catalyst layer. The electrolyte membrane used in this embodiment is a solid polymer membrane of Nafion (registered trademark) or the like. The electrolyte membrane used herein may also be other electrolyte membranes such as an electrolyte membrane of a solid oxide, or the like. In each separator, there are formed a channel for hydrogen as a fuel gas to be supplied to the anode, a channel for air as an oxidant gas to be supplied to the cathode, and a channel for cooling water. Incidentally, the number of fuel cell units 40 stacked may be arbitrarily set according to the output that is requested of the fuel cell stack 100.

As shown in the drawing, the fuel cell stack 100 is constructed by stacking an end plate 10*a*, an insulating plate 20*a*, a current collecting plate 30*a*, a plurality of fuel cell units 40, a current collecting plate 30*b*, an insulating plate 20*b* and an end plate 10*b* in that order from an end. Each of these plates or the like is provided with a supply opening or a discharge opening (not shown) for causing hydrogen, air or the cooling water to flow in the fuel cell stack 100. Besides, within the fuel cell stack 100, there are formed supply manifolds (a hydrogen supply manifold, an air supply manifold and a cooling water supply manifold) for distributing and supplying hydrogen, air and cooling water, respectively, to each fuel cell unit 40, and discharge manifolds (a cathode off-gas discharge manifold and a cooling water discharge manifold) for collecting a cathode off-gas discharged from the cathode of each fuel cell unit 40 and cooling water, respectively, and discharging the gas and the cooling water to the outside of the fuel cell stack 100 (not shown).

The fuel cell stack 100 of this embodiment is a so-called anode dead-end type fuel cell in which substantially the entire amount of hydrogen supplied to the anode of each fuel cell unit 40 is used for electricity generation while residing within the fuel cell stack 100 without being discharged to the outside of the fuel cell stack 100. Therefore, within the fuel cell stack 100, there is not formed an anode off-gas discharge manifold for gathering the anode off-gas discharged from the anode of each fuel cell unit 40 and discharging the anode-off gas to the outside of the fuel cell stack 100.

Besides, the fuel cell stack 100 is provided with a temperature sensor 42 for detecting the temperature of the fuel cell units 40. In this embodiment, the temperature sensor 42 is disposed on a fuel cell unit 40 which is disposed at an outermost end of the fuel cell unit 40 and is therefore likely to experience a greatest temperature decline, among the fuel cell units 40 of the fuel cell stack 100. By detecting the temperature of the fuel cell unit 40, the temperature sensor 42 is able to indirectly detect the temperature of the membrane-electrode assembly of the fuel cell unit 40.

The end plates 10*a*, 10*b* are formed of a metal, such as steel or the like, in order to secure a rigidity. The insulating plates 20*a*, 20*b* are each formed by an insulating member of rubber, resin or the like. The current collecting plates 30*a*, 30*b* are each formed by a gas-impermeable electroconductive member of dense carbon, copper, etc. Each of the current collecting plates 30*a*, 30*b* is provided with an output terminal (not shown) so that the electric power generated by the fuel cell stack 100 can be output.

Although not shown in the drawing, the fuel cell stack 100 is provided with a pressing force in the stacking direction of the stack structure in order to restrain leakage of gas or restrain the decline in the cell performance due to increase in the contact resistance at some site in the stack structure.

The anodes of the fuel cell stack 100 are supplied with hydrogen as the fuel gas, via a piping 53, from a hydrogen tank 50 that stores high-pressure hydrogen. The piping 53 is provided with a pressure sensor 54. This pressure sensor 54 is used to control the pressure and amount of hydrogen supplied to the anodes. Instead of the provision of the hydrogen tank 50, a hydrogen-rich gas may be produced by a reforming reaction that uses alcohol, hydrocarbon, aldehyde, etc. as raw materials, and may be supplied to the anodes.

The high-pressure hydrogen stored in the hydrogen tank 50 is adjusted in pressure and supply amount by a shut valve 51 provided at an outlet opening of the hydrogen tank 50, and also by a regulator 52, and is supplied to the anode of each fuel cell unit 40 via a hydrogen supply manifold. The hydrogen tank 50, the shut valve 51, the regulator 52, the piping 53, and the hydrogen supply manifold can be regarded as fuel gas supply portions in the invention. Incidentally, since this fuel cell system 1000 incorporates the anode dead-end type fuel cell stack 100 as described above, a piping for discharging the exhaust gas from the anodes to the outside is not provided in this embodiment.

The cathodes of the fuel cell stack 100 are supplied with a compressed air produced by a compressor 60, as an oxidant gas containing oxygen, via a piping 61. Then, this compressed air is supplied to the cathode of each fuel cell unit 40 via an air supply manifold connected to the piping 61. The cathode off-gas discharged from the cathode of each fuel cell unit 40 is discharged to the outside of the fuel cell stack 100 via a discharge piping 62 connected to the cathode off-gas discharge manifold. The discharge piping 62 is provided with a pressure sensor 63 and a pressure regulating valve 64, which are used to control the pressure and amount of air supplied. Product water produced at the cathodes of the fuel cell stack 100 by the electrochemical reaction between hydrogen and oxygen is discharged together with the cathode off-gas from the discharge piping 62. The compressor 60, the piping 61, and the air supply manifold can be regarded as oxidant gas supply portions in the invention. Besides, the anode off-gas discharge manifold, the discharge piping 62, and the pressure regulating valve 64 can be regarded as cathode off-gas discharge portions in the invention.

Since the fuel cell stack 100 produces heat due to the foregoing electrochemical reaction, the cooling water for cooling the fuel cell stack 100 is also supplied to the fuel cell stack 100. The cooling water is caused to flow in a piping 72 by a pump 70, and is cooled by a radiator 71, and then is supplied to the fuel cell stack 100.

The operation of the fuel cell system 1000 is controlled by a control unit 80. The control unit 80 is a microcomputer that includes a CPU, a RAM, a ROM, a timer, etc. The control unit 80 acquires a requested output that is requested of the fuel cell system 1000 by a load, from an accelerator operation amount sensor (not shown), and controls the operation of the system, for example, the driving of various valves or pumps, or the like, following programs stored in the ROM. Incidentally, the control unit 80 executes a start-up control process described below, at the time of start-up of the fuel cell stack 100, that is, at the time of starting to supply hydrogen and air to the fuel cell stack 100. The control unit 80 can be regarded as a requested-output input portion and an output control portion in the invention.

Incidentally, the fuel cell system 1000 of this embodiment includes a battery (not shown), and the control unit 80 can also performs a control of outputting electric power from the fuel cell stack 100, or outputting electric power from the battery, or storing the electric power generated by the fuel cell stack 100 into the battery.

Figure 2:
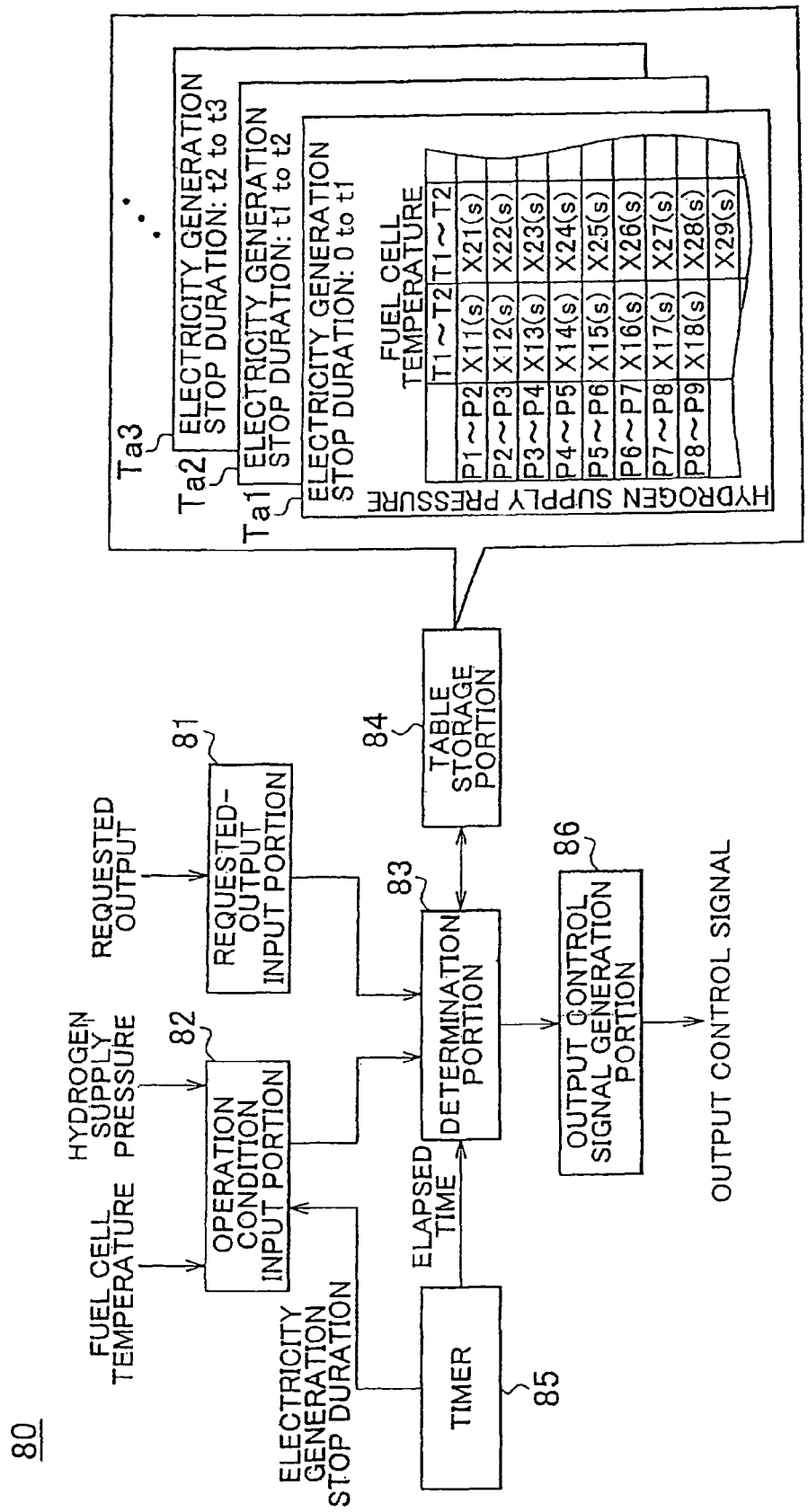
FIG. 2 is an illustrative diagram showing functional blocks for executing a start-up control process in a control unit 80 in the first embodiment.

FIG. 2 is an illustrative diagram showing functional blocks for executing the start-up control process in the control unit 80 of a first embodiment. As shown in FIG. 2, the control unit 80 includes a requested-output input portion 81, an operation condition input portion 82, a determination portion 83, a table storage portion 84, a timer 85, and an output control signal generation portion 86.

The requested-output input portion 81 acquires a requested output that is requested of the fuel cell system 1000 by a load. The output control signal generation portion 86 generates an output control signal that prohibits output from the fuel cell stack 100, at the time of start-up of the fuel cell stack 100.

After a time set by the determination portion 83 elapses, the output control signal generation portion 86 generates an output control signal for performing output according to the requested output. The timer 85 measures an electricity generation stop duration of the fuel cell stack 100, and en elapsed time following the time of start-up of the fuel cell stack 100. The operation condition input portion 82 acquires, as operation conditions of the fuel cell stack 100, the temperature of the fuel cell unit 40 detected by the temperature sensor 42 at the time of start-up of the fuel cell stack 100, the hydrogen supply pressure to the fuel cell unit 40 detected by the pressure sensor 54 at the time of start-up, and the electricity generation stop duration of the fuel cell stack 100 measured by the timer 85. The determination portion 83 sets a time that elapses until the startup-time output restriction on the fuel cell stack 100 is lifted (hereinafter, referred to as the output restriction time), on the basis of the requested output acquired by the requested-output input portion 81, the temperature of the fuel cell unit 40 acquired by the operation condition input portion 82, the hydrogen supply pressure to the fuel cell unit 40, the electricity generation stop duration of the fuel cell stack 100, and a table stored in the table storage portion 84. Then, with reference to the timer 85, the determination portion 83 determines whether or not the output restriction time has elapsed.

The table storage portion 84 stores a table in which a relation between the foregoing operation conditions and the output restriction time is recorded beforehand. In this embodiment, the table storage portion 84 stores a plurality of tables Ta1, Ta2, Ta3, . . . . These tables are prepared separately for the individual electricity generation stop durations of the fuel cell stack 100. In the example shown FIG. 2, for example, the table Ta1 is for use in the case where the electricity generation stop duration of the fuel bell stack 100 is 0 to t1. The table Ta1 shows that if the hydrogen supply pressure at the time of start-up of the fuel cell stack 100 is P1 to P2 and the temperature of the fuel cell unit 40 (fuel cell temperature) is T1 to T2, the output restriction time is X11 second.

Figure 3:
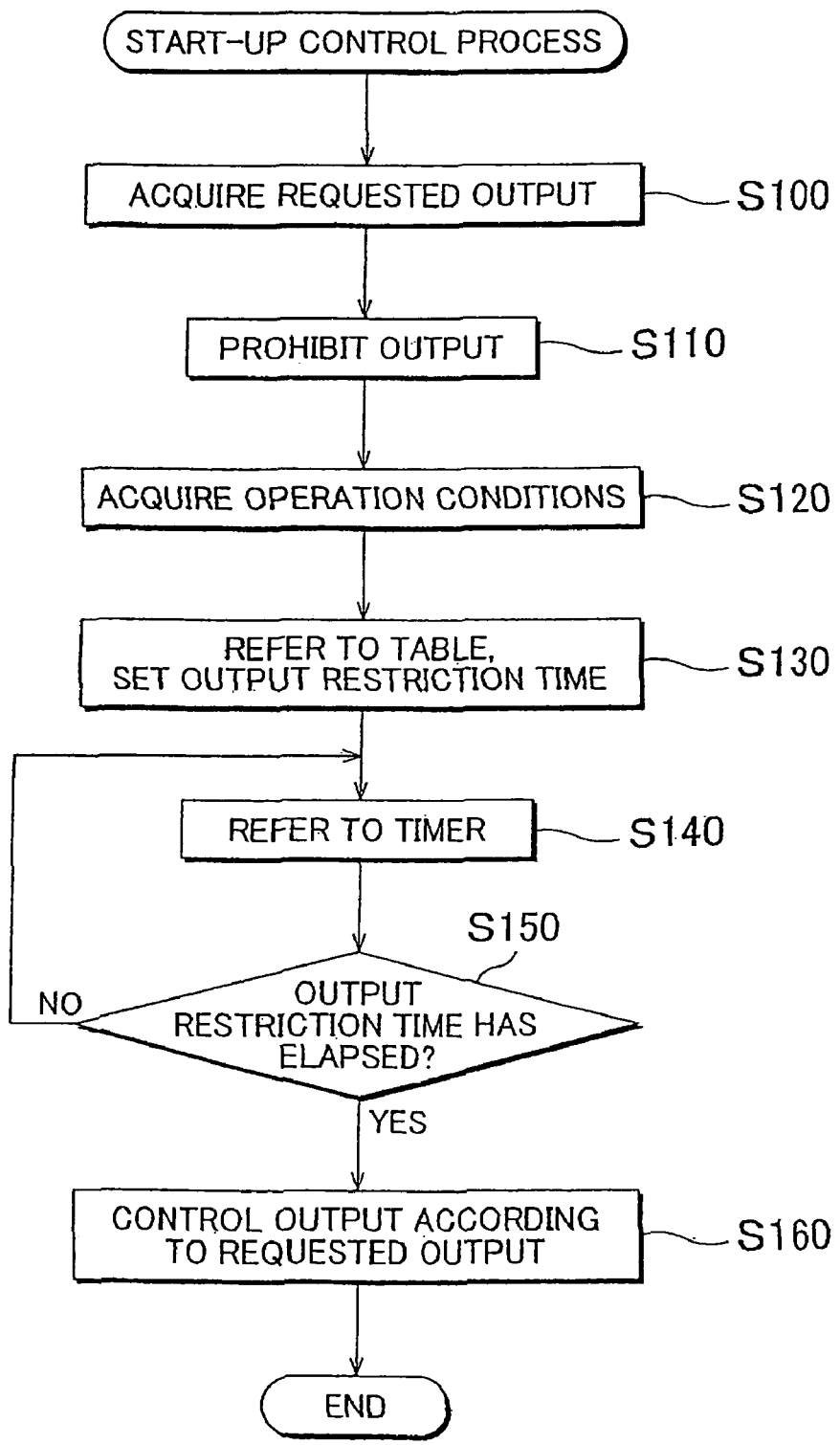
FIG. 3 is a flowchart showing the flow of the start-up control process of the first embodiment.

FIG. 3 is a flowchart showing the flow of a start-up control process of the first embodiment. This process is executed by the CPU of the control unit 80 at the time of start-up of the fuel cell stack 100. Incidentally, when this process is started, the timer 85 is measuring the electricity generation stop duration following the stop of the previous electricity generation of the fuel cell stack 100.

Firstly, the CPU acquires the requested output requested of the fuel cell system 1000 by a load via the requested-output input portion 81 (step S100). On the basis of the acquired requested output, the CPU performs the supply of hydrogen to the anodes of the fuel cell stack 100, the supply of air to the cathodes of the fuel cell stack 100, and prohibits the output from the fuel cell stack 100 (step S110). In this embodiment, during execution of the start-up control process, the supply of electric power from the fuel cell stack 100 to the load is not performed, but electric power is supplied from the battery to the load. In addition, in this embodiment, the supply of hydrogen to the anodes of the fuel cell stack 100 and the supply of air to the cathodes thereof are simultaneously performed. At this time, the timer 85 starts to measure the elapsed time from the start-up of the fuel cell stack 100.

Then, the CPU acquires the start-up-time operation conditions of the fuel cell stack 100, via the operation condition input portion 82 (step S120). In this embodiment, the CPU acquires, as the operation conditions of the fuel cell stack 100, the temperature of the fuel cell unit 40 detected by the temperature sensor 42 at the time of start-up of the fuel cell stack 100, the hydrogen supply pressure detected by the pressure sensor 54 at the start-up time, and the electricity generation stop duration of the fuel cell stack 100 measured by the timer 85, as described above.

Then, the CPU sets an output restriction time via the determination portion 83 (step S130). In this embodiment, as described above, the output restriction time is set on the basis of the requested output acquired in step S100 by the requested-output input portion 81, the temperature of the fuel cell unit 40, the supply pressure of hydrogen and the electricity generation stop duration acquired in step S120 by the operation condition input portion 82, and the tables stored in the table storage portion 84.

Then, the CPU refers to the timer 85 (step S140), and determines, via the determination portion 83, whether or not the output restriction time of the fuel cell stack 100 has elapsed (step S150). The reference to the timer 85 herein means that the elapsed time from the start-up of the fuel cell stack 100 measured by the timer 85 is compared with the aforementioned output restriction time. If the output restriction time has not elapsed (NO in step S150), the process returns to step S140. On the other hand, if the output restriction time has elapsed (YES in step S150), the CPU generates the output control signal for performing output according to the requested output, via the output control signal generation portion 86, and thus controls the output according to the requested output (step S160). Specifically, the CPU connects the load to the fuel cell stack 100, and performs the operation control of the fuel cell stack 100 according to the requested output. Then, the start-up control process ends.

As described above, the fuel cell system 1000 of this embodiment uses air as the oxidant gas. Therefore, in the membrane-electrode assembly provided in each fuel cell unit 40, an impurity gas, such as nitrogen or the like, which is contained in the air and does not contribute to electricity generation permeates through the electrolyte membrane from the cathode side to the anode side. The permeation of the impurity gas (nitrogen) from the cathode side to the anode side continues to occur even during the stop of electricity generation of the fuel cell stack 100, so that the impurity gas resides on the anode side.

The fuel cell stack 100 of this embodiment is an anode dead-end type fuel cell, and does not discharge the anode off-gas to the outside of the fuel cell stack 100. Therefore, when hydrogen is supplied to the anodes at the time of start-up of the fuel cell stack 100, the flow of hydrogen causes the impurity gas residing at each anode to locally reside in downstream regions in the flowing direction of hydrogen. Then, if electricity generation is performed in this state, the hydrogen concentration becomes lower in a region in the membrane-electrode assembly in which the impurity gas is residing than in a region therein in which the impurity gas is not residing. As a result, the distribution of electricity generation in the membrane-electrode assembly becomes non-uniform, bringing about a decline in the electricity generation efficiency.

Furthermore, if the fuel cell system 1000 is caused to generate electricity with the impurity gas locally residing in portions of the anodes and therefore electric power is supplied to the load, there is possibility of the cell voltage declining and the operation of the vehicle (system) being affected.

Furthermore, in the fuel cell stack 100, if the hydrogen concentration declines in a membrane-electrode assembly, the electromotive force in that membrane-electrode assembly declines, and a reverse voltage occurs between the anode and the cathode of the membrane-electrode assembly. The anode and the cathode of the membrane-electrode assembly are each constructed of a catalyst layer and a gas diffusion layer. It is often the case that a carbon supporting a catalyst metal is used in the catalyst layer. Therefore, if a reverse voltage occurs between the anode and the cathode of a membrane-electrode assembly, there is possibility of the catalyst layer of the anode side of the membrane-electrode assembly degrading due to carbon oxidation.

According to the above-described fuel cell system 1000 of the first embodiment, in the foregoing start-up control process, the output from the fuel cell stack 100 is prohibited at the time of start-up of the fuel cell stack 100 (step S110 in FIG. 3). In consequence, the problem caused by the local residence of the impurity gas in the anode of a membrane-electrode assembly at the time of start-up of the fuel cell stack 100 can be restrained.

Besides, the fuel cell system 1000 of the first embodiment, during the start-up control process, sets the output restriction time on the basis of the start-up-time operation conditions of the fuel cell stack 100 and the above-described table (see FIG. 1). After the output restriction time elapses, the fuel cell system 1000 lifts the output restriction in order to start the output from the fuel cell stack 100 (step S120 to S160 in FIG. 3). Therefore, the output according to the requested output can be started while the foregoing problem is restrained.

Incidentally, in the above-described table, the output restriction time is set at a value that makes it possible to determine that the difference between the partial pressure of the impurity gas in the anode of a membrane-electrode assembly and the partial pressure of the impurity gas in the cathode of the membrane-electrode assembly is less than a predetermined value, and that the output according to the requested output can be performed. This is because as time elapses after the supply of hydrogen to the anode of each membrane-electrode assembly starts, the impurity gas having locally resided in a portion of the anode permeates through the electrolyte membrane to the cathode side due to a concentration gradient or the supply pressure of hydrogen. In consequence, the partial pressure of the impurity gas in the anode and the partial pressure of the impurity gas in the cathode approach an equilibrium state, that is, the partial pressure of hydrogen in the anode and the partial pressure of oxygen in the cathode approach an equilibrium state. The output restriction time of the fuel cell stack 100, that is, the time that it takes for the partial pressure of the impurity gas in the anode and the partial pressure of the impurity gas in the cathode to approach the equilibrium state, is related to the start-up-time operation condition of the fuel cell stack 100. The correspondence relation therebetween can be empirically or analytically known beforehand.

Figure 4:
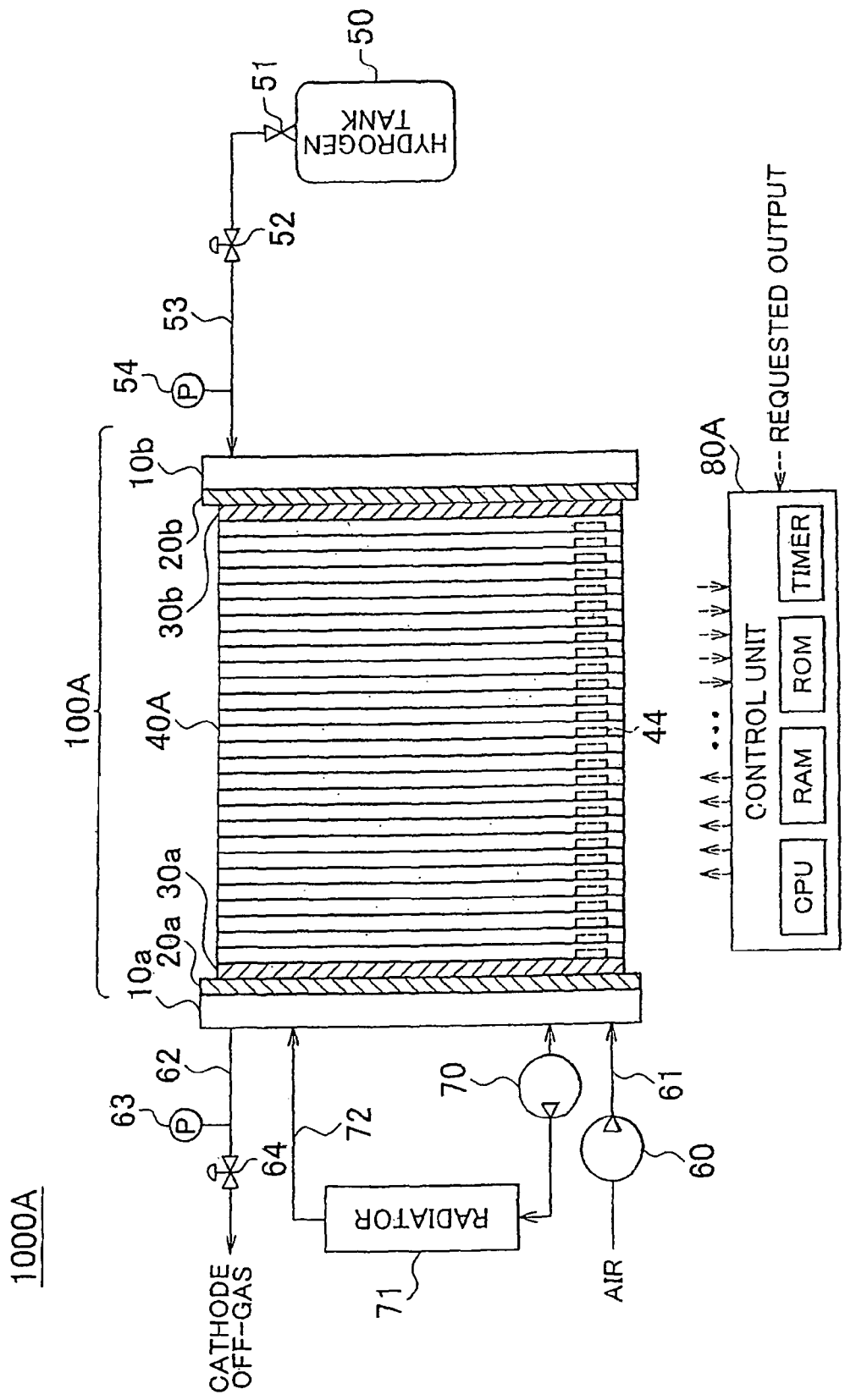
FIG. 4 is an illustrative diagram showing a general construction of a fuel cell system 1000A of a second embodiment of the invention.

FIG. 4 is an illustrative diagram showing a general construction of a fuel cell system 1000A of a second embodiment of the invention. The fuel cell system 1000A of the second embodiment is different from fuel cell stack 100 of the first embodiment in the construction of a fuel cell stack 100A. Specifically, in the fuel cell stack 100A of the embodiment, a hydrogen concentration sensor 44 is provided in each unit cell unit 40A so as to detect the hydrogen concentration in the anode of the membrane-electrode assembly. The hydrogen concentration sensor 44 can be regarded as a concentration sensor in the invention. Besides, the content of a start-up control process executed by a control unit 80A is different from the content of the start-up control process executed by the control unit 80 provided in the first embodiment. In the other respects, the fuel cell system 1000A of the second embodiment is the same as the foregoing fuel cell system 1000 of the first embodiment. In addition, in each fuel cell unit 40A, the hydrogen concentration sensor 44 is disposed in a downstream region in the flowing direction of hydrogen in which the aforementioned impurity gas is likely to reside.

Figure 5:
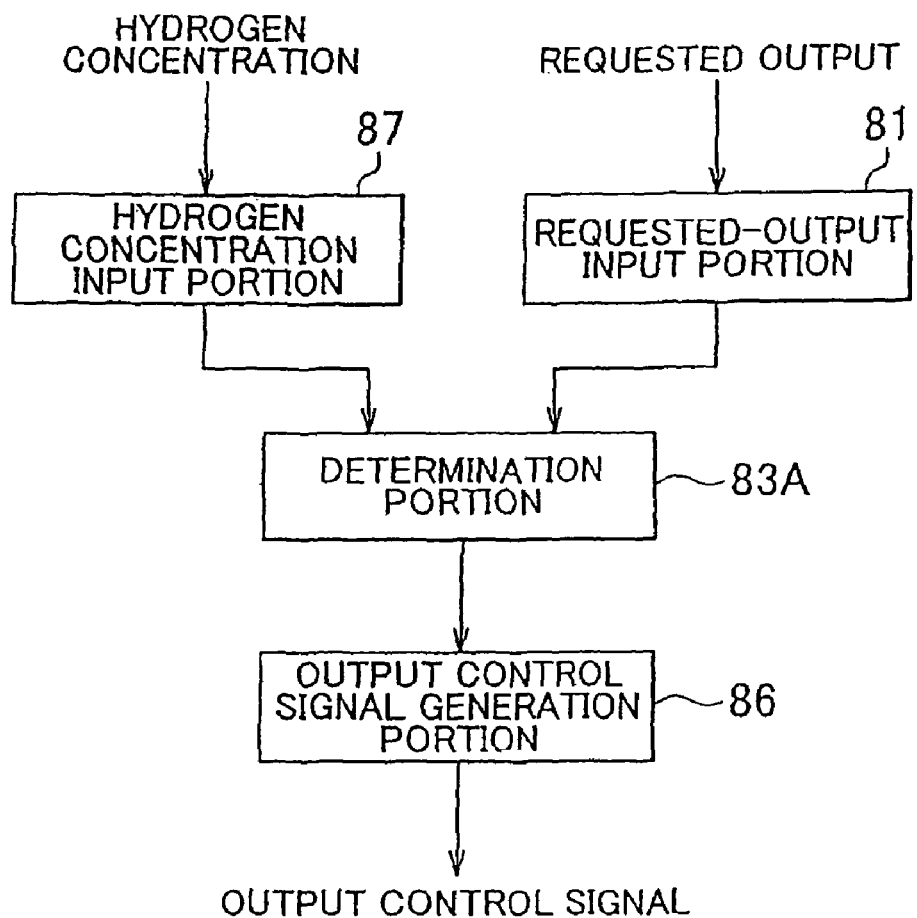
FIG. 5 is an illustrative diagram showing functional blocks for executing a start-up control process in a control unit 80A in the second embodiment.

FIG. 5 is an illustrative diagram showing functional blocks for executing the start-up control process in the control unit 80A of the second embodiment. As shown in FIG. 5, the control unit 80A includes a requested-output input portion 81, a hydrogen concentration input portion 87, a determination portion 83A, and an output control signal generation portion 86.

The requested-output input portion 81 acquires a requested output that is requested of the fuel cell system 1000A by a load. The output control signal generation portion 86 generates an output control signal that prohibits the output from the fuel cell stack 100A at the time of start-up of the fuel cell stack 100A. After it is determined by the determination portion 83A that it is permissible to lift the restriction of the output of the fuel cell stack 100A, the output control signal generation portion 86 generates an output control signal for performing output according to the requested output. The hydrogen concentration input portion 87 acquires the hydrogen concentration detected by the hydrogen concentration sensor 44 provided in each fuel cell unit 40A. The determination portion 83A determines whether or not it is permissible to lift the start-up-time output restriction on the fuel cell stack 100A on the basis of the hydrogen concentration acquired via the hydrogen concentration input portion 87.

Figure 6:
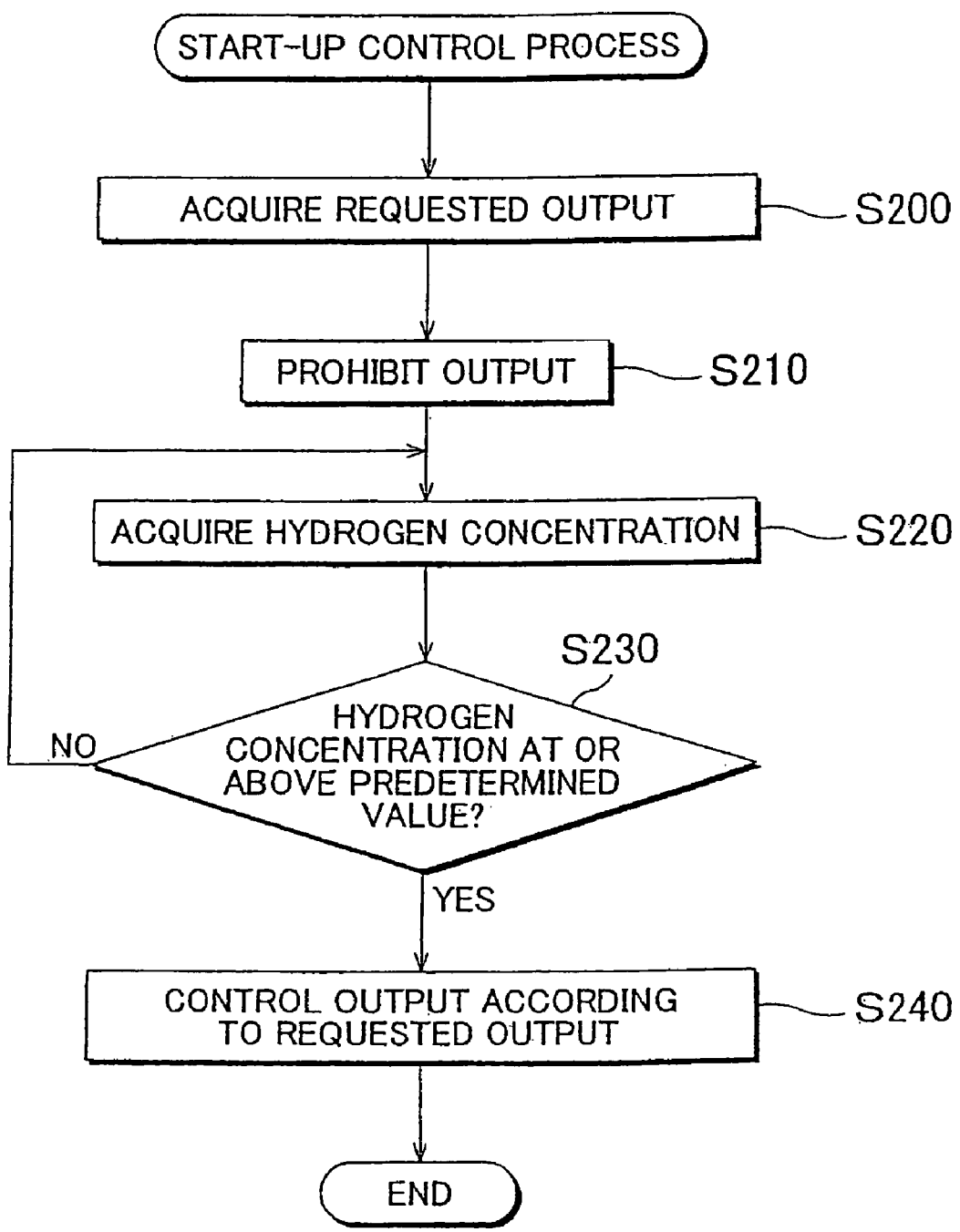
FIG. 6 is a flowchart showing the flow of the start-up control process of the second embodiment.

FIG. 6 is a flowchart showing the flow of the start-up control process of the second embodiment. This process is executed by the CPU of the control unit 80A at the time of start-up of the fuel cell stack 100A.

Firstly, the CPU acquires the requested output that is requested of the fuel cell system 1000A by the load, via the requested-output input portion 81 (step S200). On the basis of the acquired requested output, the CPU causes hydrogen and air to be supplied to the anodes and the cathodes of the fuel cell stack 100A, respectively, and prohibits the output from the fuel cell stack 100A (step S210). In this embodiment, too, during execution of the start-up control process, electric power is not supplied from the fuel cell stack 100A to the load, but electric power is supplied from the battery to the load. Incidentally, in this embodiment, the supply of hydrogen to the anodes of the fuel cell stack 100A and the supply of air to the cathodes thereof are simultaneously performed, as in the first embodiment.

Then, the CPU acquires the hydrogen concentration detected by the hydrogen concentration sensor 44 in the anode of each fuel cell unit 40, via the hydrogen concentration input portion 87 (step S220). Immediately after the start-up control process starts, the flow of hydrogen supplied causes the impurity gas having resided in the anode of each membrane-electrode assembly to locally reside in a downstream region in the flow of hydrogen, so that the hydrogen concentration detected by the hydrogen concentration sensor 44 is relatively low. Then, as time elapses, the locally residing impurity gas permeates through the electrolyte membrane to the cathode side due to a concentration gradient. Therefore, the hydrogen concentration detected by each hydrogen concentration sensor 44 gradually heightens.

Then, the CPU determines via the determination portion 83A whether or not the hydrogen concentration is higher than or equal to a predetermined value in all the fuel cell units 40A, that is, whether or not it is permissible to lift the output restriction on the fuel cell stack 100A (step S230). If the hydrogen concentration in any of the fuel cell units 40A is less than the predetermined value (NO in step S230), the process returns to step S220. On the other hand, if the hydrogen concentration in each of the fuel cell units 40A is higher than or equal to the predetermined value, the CPU generates, via the output control signal generation portion 86, an output control signal for performing the output according to the requested output, and controls the output according to the requested output (step S240). Specifically, the CPU connects the load to the fuel cell stack 100A, and performs an operation control of the fuel cell stack 100A according to the requested output. Then, the start-up control process ends.

The fuel cell system 1000A of the second embodiment can achieve substantially the same effects as the system of the first embodiment described above. Concretely, in the start-up control process, the output of the fuel cell stack 100A is prohibited at the time of start-up of the fuel cell stack 100A (step S210 in FIG. 6). In consequence, the problem caused by the impurity gas locally residing in the anode of a membrane-electrode assembly at the time of start-up of the fuel cell stack 100A described above can be restrained.

Besides, in the fuel cell system 1000A of the second embodiment, the hydrogen concentration in the anode of each membrane-electrode assembly can be directly detected by each hydrogen concentration sensor 44, and it can be determined whether or not it is permissible to lift the restriction of the output of the fuel cell stack 100A.

Figure 7:
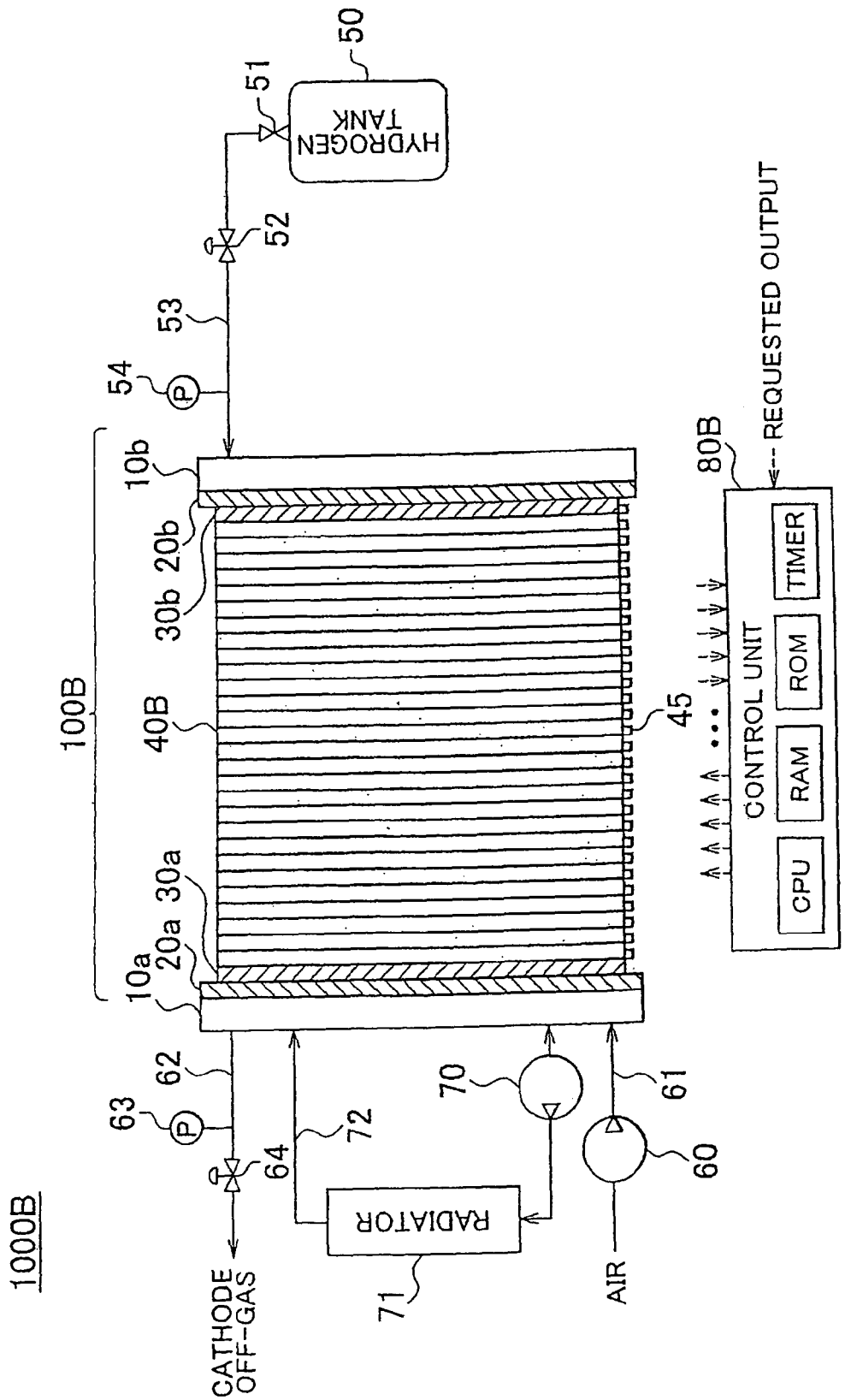
FIG. 7 is an illustrative diagram showing a general construction of a fuel cell system 1000B of a third embodiment of the invention.

FIG. 7 is an illustrative diagram showing a general construction of a fuel cell system 1000B of a third embodiment of the invention. The fuel cell system 1000B of the third embodiment is different from the fuel cell stack 100 of the first embodiment in the construction of a fuel cell stack 100B. Specifically, in the fuel cell stack 100B of this embodiment, a voltage sensor 45 is provided in each fuel cell unit 40B so as to detect the voltage (cell voltage) between the anode and the cathode of the membrane-electrode assembly. The voltage sensor 45 can be regarded as a voltage detection portion in the invention. Besides, the content of a start-up control process executed by a control unit 80B is different from the content of the start-up control process executed by the control unit 80 of the first embodiment. In the other respects, the fuel cell system 1000B of the third embodiment is the same as the foregoing fuel cell system 1000 of the first embodiment.

Figure 8:
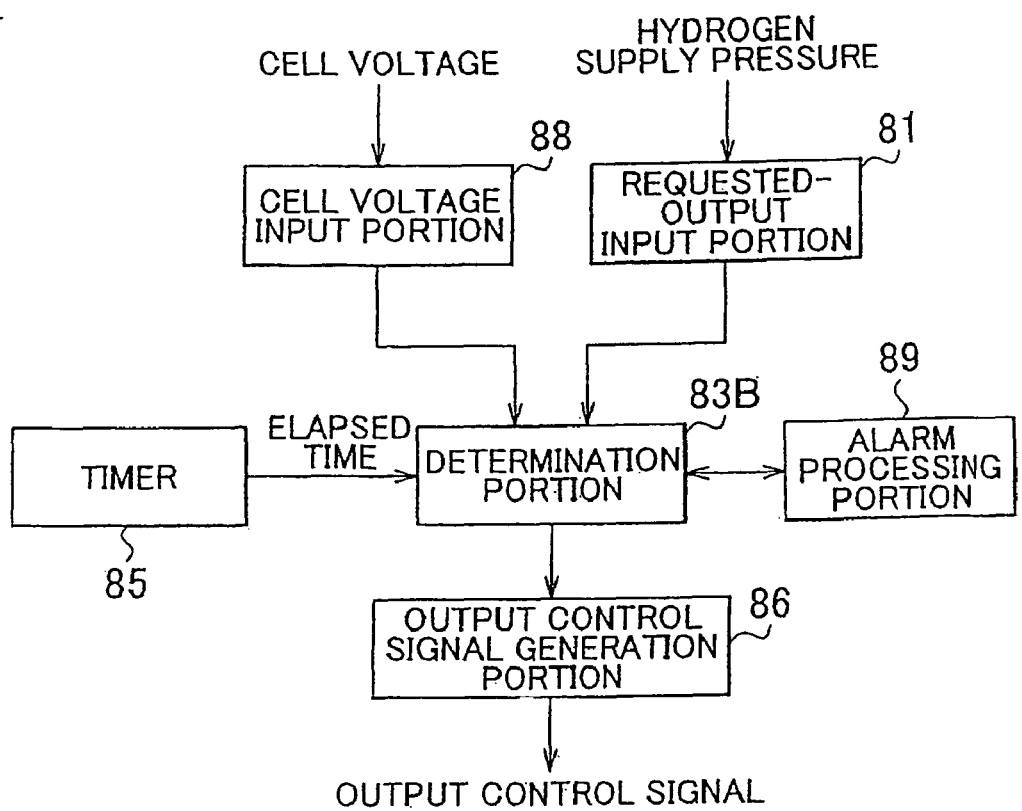
FIG. 8 is an illustrative diagram showing functional blocks for executing a start-up control process in a control unit 80B in the third embodiment.

FIG. 8 is an illustrative diagram showing functional blocks for executing the start-up control process in the control unit 80B of the third embodiment. As shown in FIG. 8, the control unit 80B includes a requested-output input portion 81, a cell voltage input portion 88, a determination portion 83B, a timer 85, an output control signal generation portion 86, and an alarm processing portion 89.

The requested-output input portion 81 acquires a requested output that is requested of the fuel cell system 1000B by a load. The output control signal generation portion 86 generates an output control signal that prohibits the output from the fuel cell stack 100B at the time of start-up of the fuel cell stack 100B. After it is determined by the determination portion 83B that it is permissible to lift the output restriction on the fuel cell stack 100B, the output control signal generation portion 86 generates an output control signal for performing output according to the requested output. The timer 85 measures the elapsed time following the start-up of the fuel cell stack 100. The cell voltage input portion 88 acquires the cell voltage detected by the voltage sensor 45 provided in each fuel cell unit 40B. The determination portion 83B determines whether or not it is permissible to lift the start-up-time restriction of the output of the fuel cell stack 100B on the basis of the elapsed time measured by the timer 85 and the cell voltage acquired via the voltage sensor 45.

Figure 9:
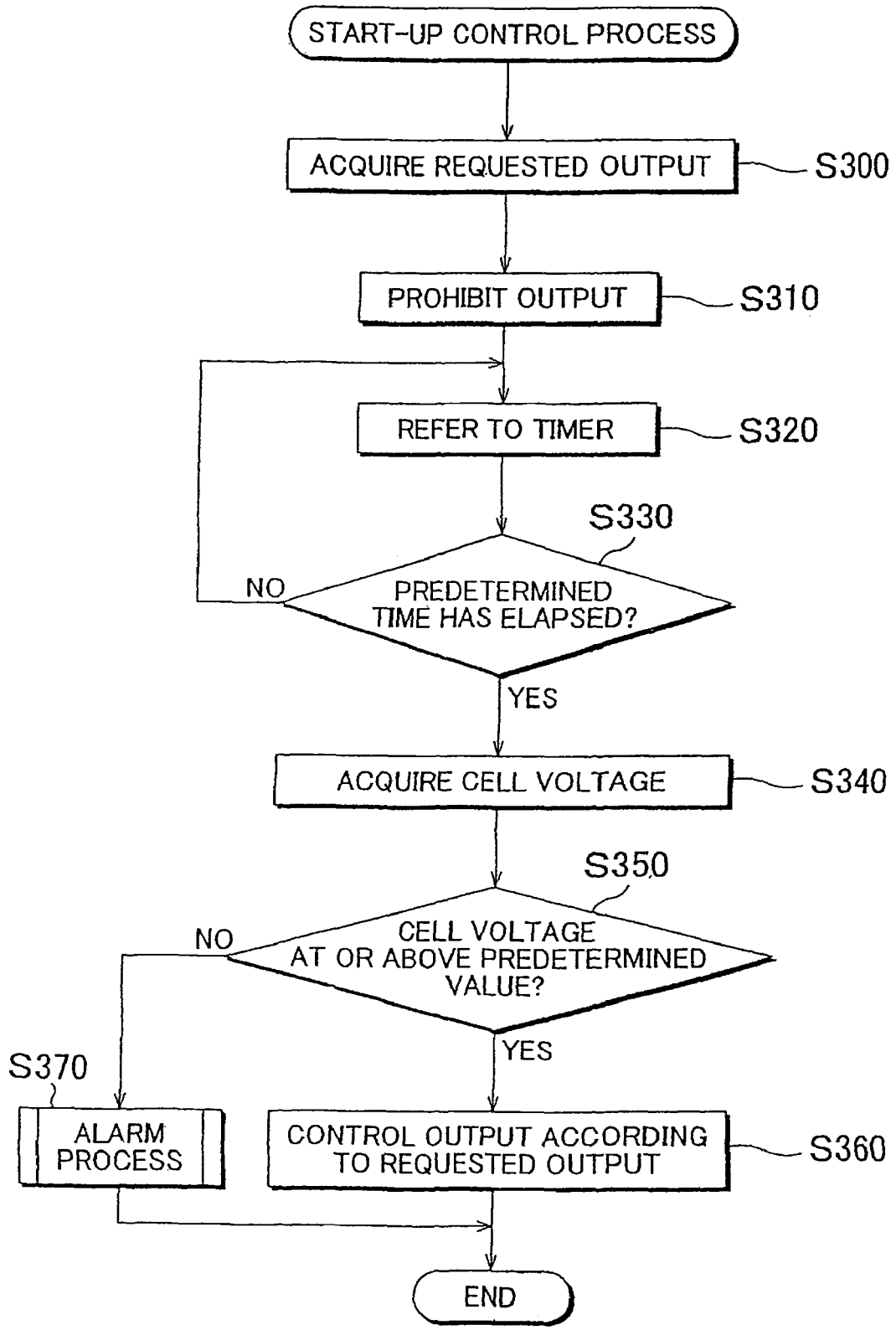
FIG. 9 is a flowchart showing the flow of the start-up control process of the third embodiment.

FIG. 9 is a flowchart showing the flow of the start-up control process of the third embodiment. This process is executed by the CPU of the control unit 80B at the time of start-up of the fuel cell stack 100A.

Firstly, the CPU acquires the requested output that is requested of the fuel cell system 1000B by the load, via the requested-output input portion 81 (step S300). On the basis of the acquired requested output, the CPU causes hydrogen and air to be supplied to the anodes and the cathodes of the fuel cell stack 100B, respectively, and prohibits the output from the fuel cell stack 100B (step S310). In this embodiment, too, during execution of the start-up control process, electric power is not supplied from the fuel cell stack 100B to the load, but electric power is supplied from the battery to the load. Incidentally, in this embodiment, the supply of hydrogen to the anodes of the fuel cell stack 100B and the supply of air to the cathodes thereof are simultaneously performed, as in the first embodiment. At this time, the timer 85 starts to measure the elapsed time following the start-up of the fuel cell stack 100B.

Next, the CPU refers to the timer 85 (step S320), and determines whether or not a predetermined time has elapsed (step S330). Immediately after the start-up control process starts, the flow of hydrogen supplied causes the impurity gas residing in each anode to locally reside in a downstream region in the flow of hydrogen. Therefore, if the detection of the cell voltage is performed at this time point, a region in which performance of electricity generation results in the residence of the impurity gas and shortage of hydrogen can experience oxidation and therefore degradation of the carbon that forms the catalyst layer of the anode of each membrane-electrode assembly. Therefore, the predetermined time is set at a length of time that makes it possible to estimate the impurity gas having locally resided has permeated through the electrolyte membrane to the cathode side and the difference between the partial pressure of the impurity gas in the anode of each membrane-electrode assembly and the partial pressure of the impurity gas in the cathode thereof has become less than a predetermined value.

If in step S330 it is determined that the predetermined time has not elapsed (NO in step S330), the process returns to step S320. On the other hand, if the predetermined time has elapsed (YES in step S330), the CPU detects the cell voltage via each voltage sensor 45, and acquires each detected cell voltage via the cell voltage input portion 88 (step S340).

Then, the CPU determines, via the determination portion 83B, whether or not the cell voltage is higher than or equal to a predetermined value in all the fuel cell units 40B, that is, whether or not it is permissible to lift the output restriction on the fuel cell stack 100B (step S350). If the cell voltage in each fuel cell unit 40B is higher than or equal to the predetermined value, the CPU generates an output control signal for performing the output according to the requested output, via the output control signal generation portion 86, and performs the output according to the requested output (step S360). Specifically, the CPU connects the load to the fuel cell stack 100B, and controls the operation of the fuel cell stack 100B according to the requested output. On the other hand, if the cell voltage in any fuel cell unit 40B is less than the predetermined value (NO in step S350), the CPU determines that the fuel cell stack 100B has an abnormality, and performs an alarm process via the alarm processing portion 89 (step S370). Examples of the alarm process include a process of lighting an alarm lamp, a process of producing an alarm sound, etc. Then, the start-up control process ends.

According to the fuel cell system 1000B of the third embodiment, in the start-up control process, the output of the fuel cell stack 100B is prohibited at the time of start-up of the fuel cell stack 100B (step S310 in FIG. 9), as in the foregoing first embodiment. In consequence, the problem caused by the impurity gas locally residing in the anode of a membrane-electrode assembly at the time of start-up of the fuel cell stack 100B described above can be restrained.

Besides, in the fuel cell system 1000B of the second embodiment, it can be determined whether or not it is permissible to lift the output restriction on the fuel cell on the basis of the cell voltage detected by each voltage sensor 45.

While embodiments of the invention have been described above, the invention is not limited by the foregoing embodiments at all, but can be carried out in various other manners as well without departing from the spirit of the invention. For example, the following modifications are possible.

MODIFICATION 1: In the first embodiment, the operation condition input portion 82 of the control unit 80 acquires, as operation conditions of the fuel cell stack 100, the temperature of the fuel cell unit 40 detected by the temperature sensor 42 at the time of start-up of the fuel cell stack 100, the hydrogen supply pressure detected by the pressure sensor 54 at the time of start-up thereof, and the electricity generation stop duration of the fuel cell stack 100 measured by the timer 85. However, the invention is not limited to this construction. It is permissible that the operation conditions not include the electricity generation stop duration of the fuel cell stack 100. Furthermore, it is also permissible that the operation conditions not include one of the temperature of the fuel cell unit 40 detected by the temperature sensor 42 and the hydrogen supply pressure detected by the pressure sensor 54. In this case, it suffices that the tables shown in FIG. 2 be prepared according to the kinds of operation conditions that the operation condition input portion 82 acquires.

Besides, the table storage portion 84 of the control unit 80 may be omitted. In this case, it suffices that in the start-up control process, the output restriction on the fuel cell stack 100 be lifted after a predetermined time elapses following the start-up of the fuel cell stack 100.

MODIFICATION 2: In the fuel cell stack 100 of the first embodiment, the temperature sensor 42 is provided in one of the fuel cell units 40 that is disposed in an outermost end portion of the fuel cell stack 100 and therefore is likely to have the greatest temperature fall. However, the invention is not limited to this construction. For example, each of the fuel cell units 40 of the fuel cell stack 100 may be provided with a temperature sensor 42. Besides, the piping 72 may also be provided with a temperature sensor, and the temperature of the fuel cell units 40 may be estimated on the basis of the temperature of the cooling water flowing in the piping 72.

MODIFICATION 3: Although in the second embodiment, the fuel cell units 40A of the fuel cell stack 100A are provided with hydrogen concentration sensors 44, the invention is not limited to this construction. Instead of the hydrogen concentration sensors 44, a sensor capable of detecting the impurity concentration, for example, a nitrogen concentration sensor, may be provided.

MODIFICATION 4: Although in the second embodiment, all the fuel cell units 40A of the fuel cell stack 100A are provided with hydrogen concentration sensors 44, the invention is not limited to this construction. For example, a fuel cell unit 40A that tends to have a local residence of impurity may be intentionally disposed in the fuel cell stack 100A, and a hydrogen concentration sensor 44 may be provided in only that fuel cell unit 40A.

MODIFICATION 5: Although in the third embodiment, the control unit 80B is provided with the alarm processing portion 89, the alarm processing portion 89 may be omitted.

MODIFICATION 6: Although in the start-up control process in the first to third embodiments, the output is prohibited immediately after the supply of hydrogen and oxygen to the fuel cell stack starts, the invention is not limited to this construction. For example, the output of the fuel cell stack may be restricted to an output (not zero) that is smaller than the requested output.

MODIFICATION 7: Although in the start-up control process in the first to third embodiments, the supply of hydrogen to the anodes of the fuel cell stack and the supply of air to the cathodes thereof are simultaneously performed, the supply of hydrogen and the supply of air may be performed at different timings. For example, if the supply of hydrogen to the anodes of the fuel cell stack is performed prior to the supply of air to the cathodes, the permeation (diffusion) of the anode-residing impurity gas through the electrolyte membrane to the cathode side can be promoted.

MODIFICATION 8: In the start-up control process in the first embodiment, hydrogen and air are supplied to the anodes and the cathodes, respectively, of the fuel cell stack 100 on the basis of the requested output that is requested of the fuel cell system 1000 by a load, and the output from the fuel cell stack 100 is prohibited (step S100 and step S110 in FIG. 3). However, the invention is not limited to this construction. In the start-up control process, the output of the fuel cell stack 100 may also be restricted independently of the requested output that is requested by the load. In this case, the amount of hydrogen supplied to the fuel cell stack 100 may be arbitrarily set. This applies to the start-up control process in the second embodiment and the third embodiment as well.

MODIFICATION 9: In the foregoing embodiments, a structure in which the fuel gas supplied to the anode is substantially entirely consumed in the anode is adopted. As for the channel construction for supplying fuel to the anode which is allowed by the operation performed in this structure, various constructions can be adopted. Representative examples of the channel construction include a comb-tooth type construction, a circulation type construction, etc., besides the foregoing construction (hereinafter, referred to as "shower channel type construction"). Firstly, modifications of the shower channel type construction will be described.

Figure 10:
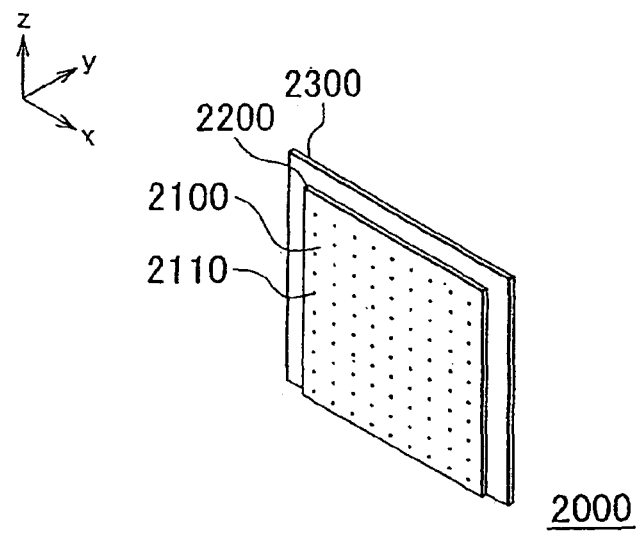
FIG. 10 is an illustrative diagram showing a construction of a first modification.

FIG. 10 is an illustrative diagram showing a construction of a first modification. The first modification has a construction in which a dispersion plate 2100 corresponding to the sheet member in the foregoing embodiments is formed as being integral with a membrane-electrode assembly 2000. The membrane-electrode assembly 2000 has a hydrogen-side electrode 2200 and an electrolyte membrane 2300. Besides, the dispersion plate 2100 is provided with many pores (orifices) 2110 at predetermined intervals.

Figure 11:
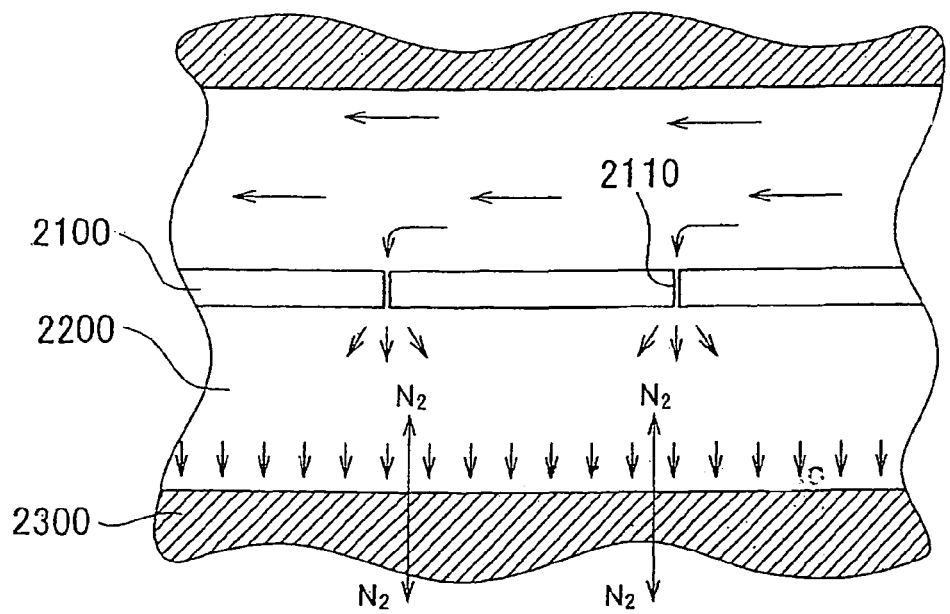
FIG. 11 is an illustrative diagram illustrating functions of a dispersion plate 2100.

FIG. 11 is an illustrative diagram illustrating the functions of the dispersion plate 2100. The fuel gas is distributed by an upstream-side channel isolated by the dispersion plate 2100 from the hydrogen-side electrode 2200 that consumes hydrogen gas. The fuel gas distributed by the upstream-side channels passes through the pores 2110 formed in the dispersion plate 2100, and is supplied locally to the hydrogen-side electrode 2200, which is a fuel gas consumption layer. That is, in this modification, the fuel gas is supplied directly to sites in the hydrogen-side electrode 2200 that correspond to the position of existence of the pores 2110. Examples of the adoptable constructions that realize this manner of local supply of the fuel gas include a construction that has a channel through which the fuel gas is supplied directly to sites of consumption of the fuel gas, without passing through other regions of the hydrogen-side electrode 2200, a construction in which the fuel gas is supplied from a direction apart from the plane of the hydrogen-side electrode 2200 (preferably from a channel isolated from the hydrogen-side electrode 2200) toward the hydrogen-side electrode 2200, mainly in a perpendicular direction, etc. On the other hand, it suffices that the hydrogen-side electrode 2200 have such a shape that the residence of nitrogen does not easily occur. For example, it suffices that the hydrogen-side electrode 2200 have a shape that is formed by smooth surfaces (flat surfaces) and that does not have a recess or the like on the electrolyte membrane 2300 side.

The diameter and the pitch of the pores 2110 of the dispersion plate 2100 can be empirically determined, and may also be set so that the flow rate of the fuel gas passing through the penetration holes 2110 can sufficiently restrain the diffusion-caused reverse flow of nitrogen gas, for example, in a predetermined operation state (e.g., a rated operation state). It suffices to set the intervals and the channel sectional areas of the pores 2110 so that a sufficient flow rate or a sufficient pressure in the pores 2110 is produced. For example, with regard to a solid polymer type fuel cell, it has been confirmed that a sufficient flow rate or a sufficient pressure loss is produced if the open area ratio of the dispersion plate 2100 is set at or below about 1%. The open area ratio is a proportion obtained by dividing the opening area of the dispersion plate 2100 by the total area of the dispersion plate 2100. Since this open area ratio is smaller by one to two orders than that of the circulation-type fuel gas channel, the first modification is essentially different from a construction in which a certain amount of flow of the fuel gas is secured by employing a compressor in a circulation-type fuel gas channel. In the embodiments and modifications, a sufficient amount of the fuel gas is secured even in a structure of a low-open area ratio, by leading the high-pressure hydrogen from the fuel tank directly to the fuel cell (or to the fuel cell with the pressure of the high-pressure hydrogen having been adjusted to a predetermined high pressure by the pressure regulating valve).

Figure 12:
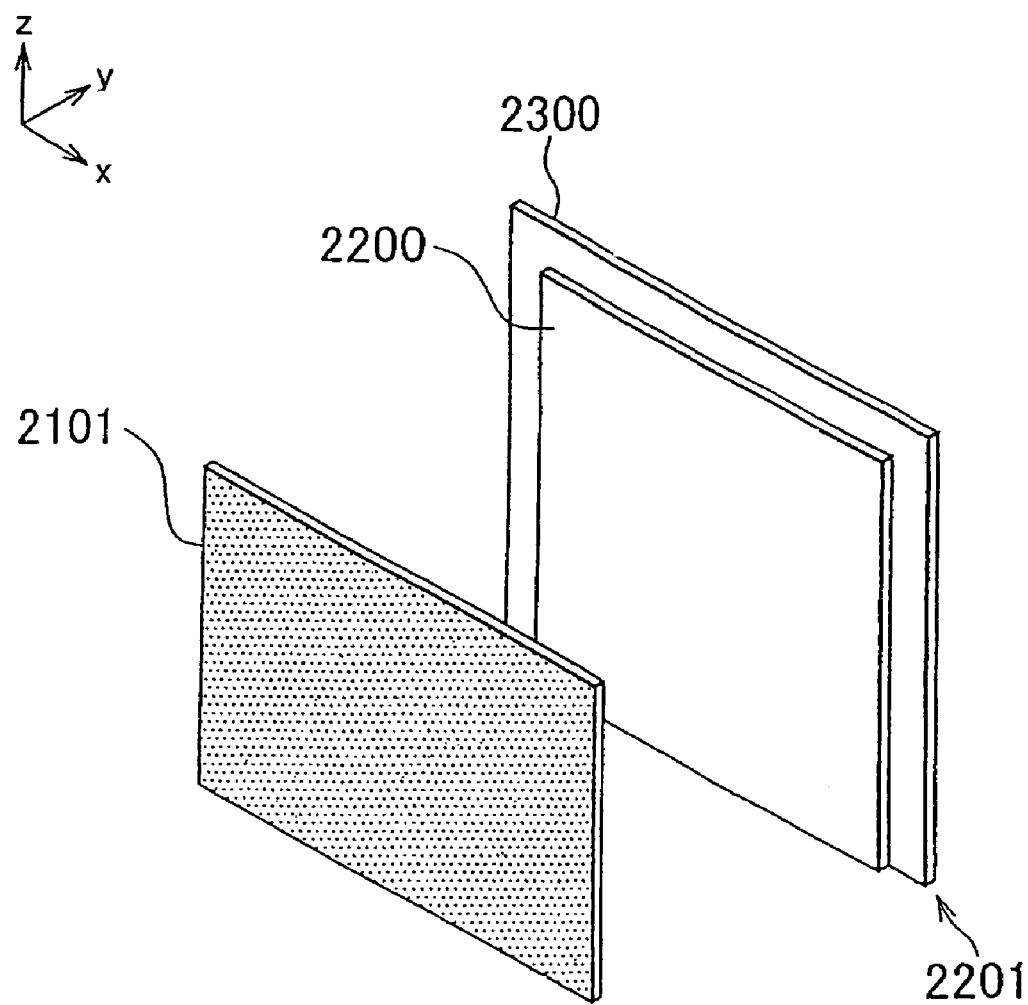
FIG. 12 is an illustrative diagram showing a construction of a second modification.

Next, other example constructions of the foregoing shower channel type construction will be described. FIG. 12 is an illustrative diagram showing a construction of a second modification. In this modification, a dispersion plate 2101 disposed on a membrane-electrode assembly 2201 provided with a hydrogen-side electrode 2200 and an electrolyte membrane 2300 is realized by using a closely packed porous body. The open area ratio of the porous body of the dispersion plate 2101 is selected so that a sufficient flow rate or a sufficient pressure loss is produced. In the case where the pore construction is used, the fuel gas is locally supplied to each pore, that is, discretely, whereas in the case where the porous body is used, there is an advantage of being able to continuously supply the fuel gas. Besides, another advantage of the supply of the fuel gas to the hydrogen-side electrode 2200 becoming more uniform can be obtained. The closely packed porous body may be produced by sintering carbon powder, or may also be produced by hardening carbon powder or metal powder through the use of a binding agent. It suffices that the porous body be a continuous porous body. The porous body may also have an anisotropy in which the continuity in the direction of thickness is secured and the continuity in planar directions is not secured. The open area ratio of the porous body may be determined in the same manner as in Modification 1.

Figure 13:
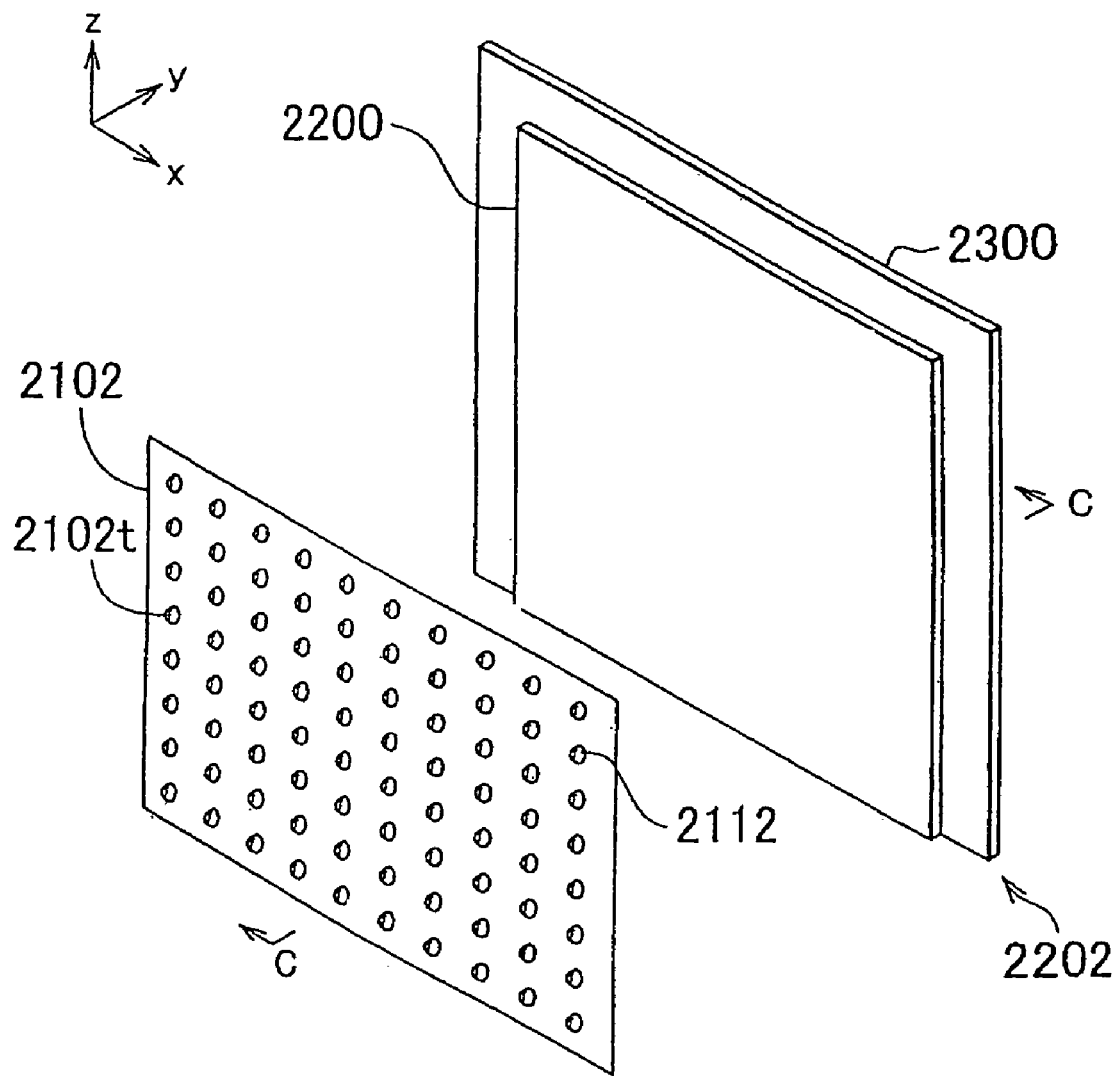
FIG. 13 is an illustrative diagram showing a dispersion plate 2102 that is constructed through the use of a pressed metal.
Figure 14:
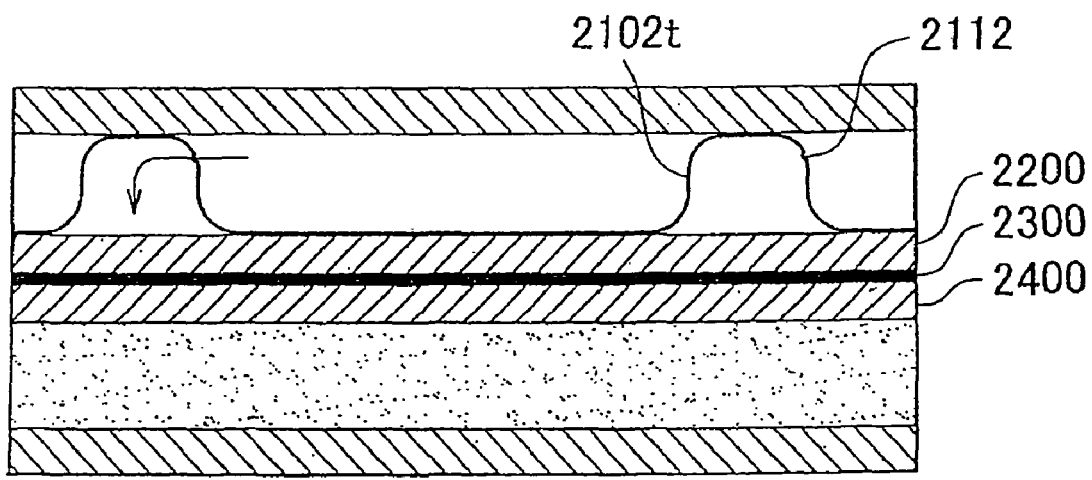
FIG. 14 is a schematic diagram showing a schematic diagram showing a section taken on plane C-C indicated in FIG. 13.

Next, a third modification will be described. FIG. 13 is an illustrative diagram showing a dispersion plate 2102 constructed through the use of a pressed metal, and FIG. 14 is a diagrammatic illustration showing a section taken on a plane C-C indicated in FIG. 13. The dispersion plate 2102 is provided with protruded portions 2102$t$ for forming channels on the upstream side of the dispersion plate 2102, and a pore 2112 is formed in a side surface of each of the protruded portions 2102$t$. The dispersion plate 2102 is disposed on a hydrogen-side electrode 2200 side of a membrane-electrode assembly 2202 that includes a hydrogen-side electrode 2200 and an oxygen-side electrode 2400 on both sides of an electrolyte membrane 2300. As shown in FIG. 14, using the protruded portions 2102$t$, the channels on the upstream side of the dispersion plate 2102 are integrally formed. The fuel gas is supplied to the hydrogen-side electrode 2200 via the pores 2112 formed in the side surfaces of the protruded portions 2102$t$.

According to this construction, the dispersion plate 2102 can easily be formed by a pressing process, and there is also an advantage of the channel upstream of the dispersion plate 2102 being able to be simply formed. The fuel gas having passed through the pores 2112 reaches the hydrogen-side electrode 2200, via the spaces within the protruded portions 2102$t$. Therefore, sufficient dispersibility can be secured. The pores 2112 may be formed by the pressing process, or may also be formed by another technique, such as a discharging process or the like, in a pre-process step or a post-process step with respect to the formation of the protruded portions 2102$t$. The open area ratio provided by the pores 2112 may be determined in substantially the same manner as in the first embodiment.

Figure 15:
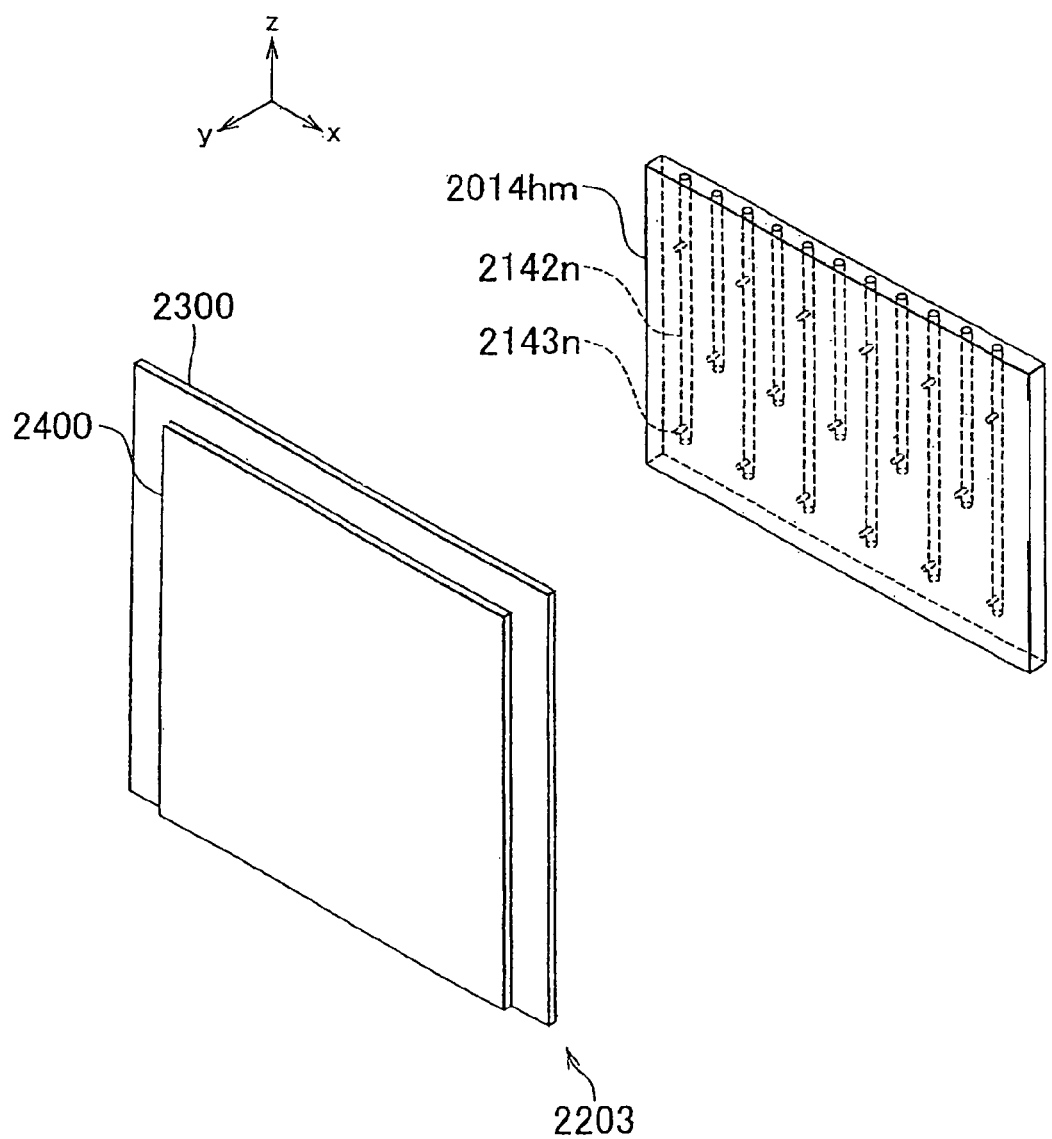
FIG. 15 is an illustrative diagram showing an example construction in which a channel is formed within a dispersion plate 2014$hm$.

Next, a fourth modification will be described. FIG. 15 is an illustrative diagram showing an example construction in which channels are formed within a dispersion plate 2014$hm$. The dispersion plate 2014$hm$ of this modification has a plurality of channels 2142$n$ that are formed in the direction of the short-sides of the rectangular dispersion plate 2014$hm$, and many pores 2143$n$ that extend from the channels 2142$n$ in the direction of the thickness of the dispersion plate 2014$hm$, and that are open to the hydrogen electrode side (not shown). The dispersion plate 2014$hm$ is disposed on a hydrogen-side electrode side of a membrane-electrode assembly 2203 that includes a hydrogen-side electrode (not shown) and an oxygen-side electrode 2400 on both sides of an electrolyte membrane 2300. The fuel gas is supplied via the dispersion plate 2014$hm$. According to this construction, an advantage of the channels to the individual pores 2143$n$ being able to be individually prepared can be obtained. Incidentally, although the arrangement of the pores 2143$n$ shown in FIG. 15 is of a zigzag pattern, the arrangement thereof may be of a lattice pattern, or may also be arranged randomly to some degree.

Figure 16:
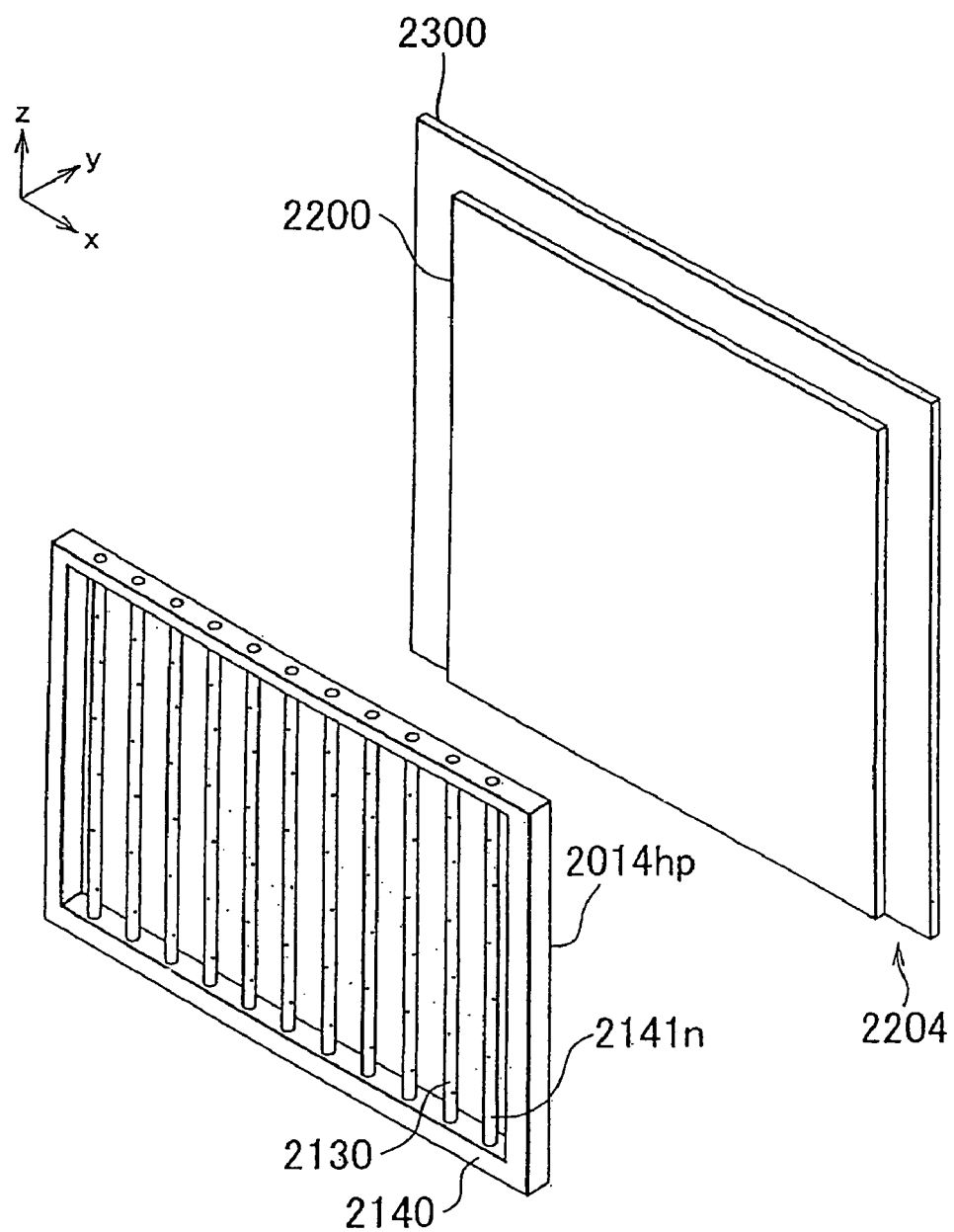
FIG. 16 is an illustrative diagram showing an example in which a dispersion plate 2014$hp$ is formed by using a pipe.

Next, a fifth modification will be described. FIG. 16 is an illustrative diagram showing an example in which a dispersion plate 2014$hp$ is formed through the use of pipes. The dispersion plate 2014$hp$ is provided with a rectangular frame 2140 as shown in FIG. 16, and is also provided with many hollow pipes 2130 that extend in the short-side direction of the rectangular frame 2140. A plurality of pores 2141$n$ are formed in surfaces of the pipes 2130. This dispersion plate 2014$hp$ is placed on a hydrogen-side electrode 2200 of a membrane-electrode assembly 2204 that includes the hydrogen-side electrode 2200 and an electrolyte membrane 2300. When the fuel gas is supplied through gas inflow openings formed in the frame 2140 of the dispersion plate 2014$hp$, the fuel gas passes through the interior of each pipe 2130 of the dispersion plate 2014$hp$, and is distributed to the hydrogen-side electrode 2200 through the pores 2141$n$. According to this construction, an advantage of there being no need to perform a hole-forming process in members or the like other than the pores 2141$n$ in order to construct the dispersion plate 2014$hp$ can be obtained, in addition to an advantage of being able to uniformly disperse the fuel gas. The pores 2141$n$ may be disposed toward the hydrogen-side electrode 2200 side, or may also be disposed toward the opposite side. In the latter case, the dispersibility of the fuel gas is further bettered.

As described above, various constructions can be adopted as long as a structure in which the fuel gas is guided while the fuel gas is being dispersed in the hydrogen-side electrode 2200 is provided. The dispersion plate is not limited to a porous body or a pressed metal, but may be made of any material as long as the dispersion plate is constructed so as to guide the fuel gas to the hydrogen-side electrode 2200 while distributing the fuel gas.

MODIFICATION 10: Although in conjunction with the foregoing embodiments, detailed description of the fuel gas channel is omitted, the form of a channel of the fuel gas may be of various constructions.

Figure 17:
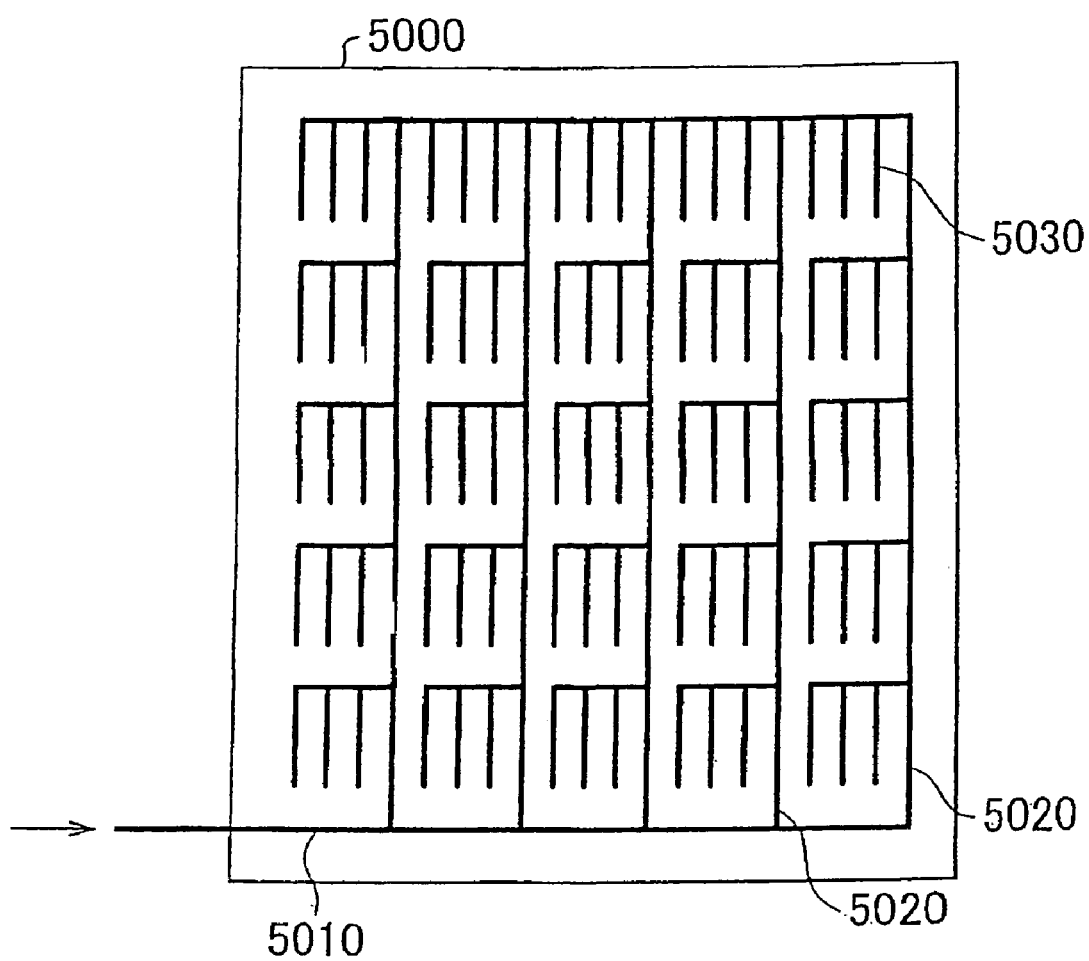
FIG. 17 is a schematic diagram showing an example construction that employs a fuel gas channel of branch channel type.

FIG. 17 is a diagrammatic illustration showing an example construction that employs a so-called branch channel type fuel gas channel. The fuel gas channel shown is formed in a comb shape in a channel-forming member 5000 that is used instead of the anode-side metallic porous body of the foregoing embodiments. Concretely, the gas channel is formed of a main channel 5010 that introduces the fuel gas, a plurality of subsidiary channels 5020 that branch from the main channel 5010 and that are formed in a direction that intersects with the main channel 5010, and comb-tooth channels 5030 further branching from the subsidiary channels 5020 in a comb shape. The main channel 5010 and the subsidiary channels 5020 have sufficient channel sectional areas as compared with the distal-end comb-tooth channels 5030. Therefore, the pressure distribution in a plane of the channel-forming member 5000 is substantially the same as or less than in the anode-side metallic porous body.

This channel-forming member 5000 can be formed by using a carbon, a metal, etc. In the case where a carbon is used, the channel-forming member 5000 provided with channels as shown in FIG. 17 can be obtained by sintering carbon powder at high temperature or low temperature in a mold. In the case where a metal is used, the channel-forming member 5000 provided with similar channels may be obtained by cutting grooves in a metal plate, or the channel-forming member 5000 provided with channels as shown in FIG. 17 may also be obtained by a pressing process. In addition, the channel-forming member 5000 does not need to be provided as a separate piece, but may also be formed integrally with another member, for example, a separator or the like.

Incidentally, this channel-forming member 5000 may be used in place of each anode-side metal porous body, and may also replace each one of the anode-side metal porous bodies and the sheet members. In this case, it suffices that the comb-tooth channels 5030 be sufficiently narrow channels and a great number of them be branched from the subsidiary channels 5020 finely, that is, in the fashion of capillary vessels. Besides, in FIG. 17, the main channel 5010 is provided along one side edge portion of the channel-forming member 5000. However, in order to lessen the pressure difference of the fuel gas in the plane of the channel-forming member 5000, the main channel 5010 may be provided along a plurality of edge portions and the length of the subsidiary channels 5020 may be shortened, or the main channel 5010 may be provided in the middle of the channel-forming member and the subsidiary channels 5020 may be disposed on the left and right sides of the main channel 5010. Likewise, the comb-tooth channels 5030 may also be provided on two opposite sides of the subsidiary channels 5020.

Figure 18A:
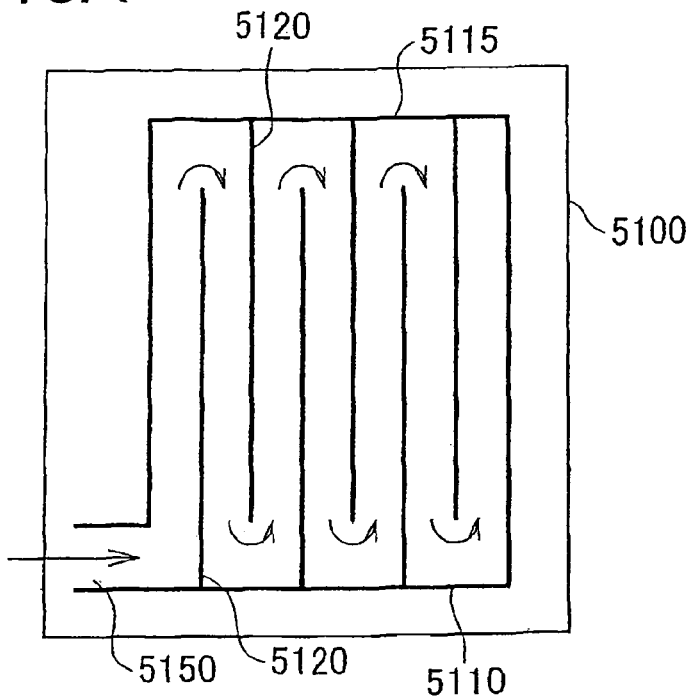
FIG. 18 is a schematic diagram schematically showing an example construction of a channel-forming member provided with a serpentine type channel that has a zigzag shape.
Figure 18B:
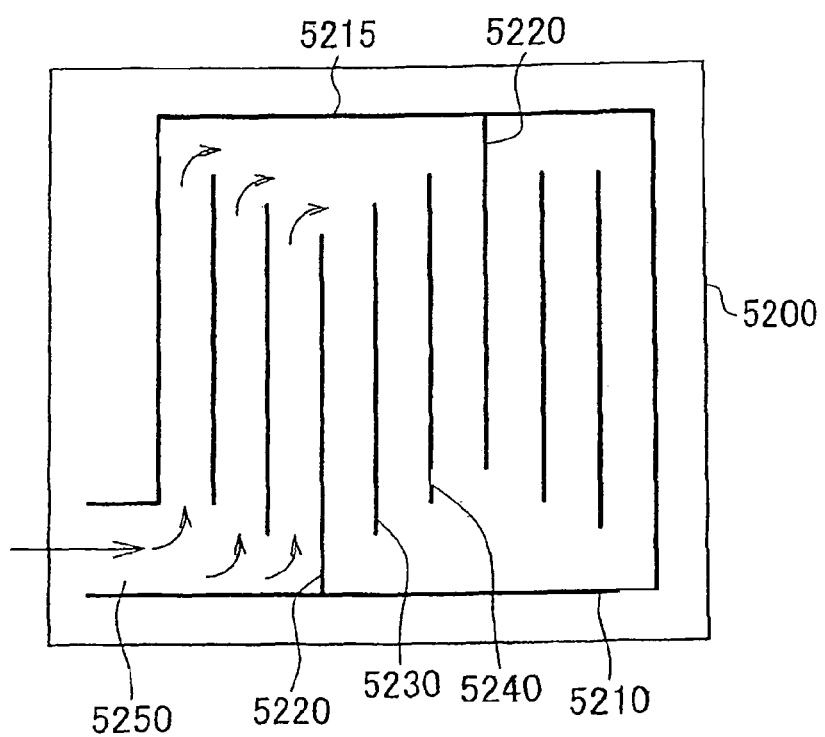

Next, a serpentine type channel construction will be described with reference to FIG. 18. FIGS. 18A and 18B are diagrammatic illustrations schematically showing example constructions of channel-forming members provided with serpentine type channels that have zigzag shapes. FIG. 18A shows, as an example, a channel-forming member 5100 that has a single channel for the fuel gas, and FIG. 18B shows, as an example, a channel-forming member 5200 in which a plurality of fuel gas channels are integrated.

As shown in FIG. 18A, the channel-forming member 5100 has a plurality of channel walls 5120 that extend inward alternately from two opposite outer walls 5110, 5115 of the outer walls that surround the fuel gas channel. Portions partitioned by the channel walls 5120 form a continuous channel. At an end of the channel, an inflow opening 5150 is formed, and the fuel gas is supplied into the channel via the inflow opening 5150. This channel-forming member 5100, similar to the channel-forming member 5000 shown in FIG. 17, is used in place of the anode-side metal porous bodies of the above-described embodiments.

FIG. 18B shows an example in which the serpentine type channel is constructed as a bundle of channels. In this case, partition walls 5230, 5240 that are not connected to outer walls 5210, 5215 are provided between a plurality of channel walls 5220 that extend inward alternately from the two opposite outer walls 5210, 5215. Besides, an inflow opening 5250 is formed at an inlet opening of the channel. The fuel gas that has flown in via the inflow opening 5250 flows through the wide serpentine type channel provided with the partition walls 5230, 5240, spreading to every portion of the channel-forming member 5200 in the planar directions. This channel-forming member 5200, similar to the channel-forming member 5000 shown in FIG. 18, is used in place of the anode-side metal porous bodies of the above-described embodiments.

The channel-forming members 5100, 5200 shown in FIGS. 18A and 18B are formed from a carbon or a metal, similarly to the channel-forming member 5000 having a comb-shape channel shown in FIG. 17. The forming method for the channel-forming members 5100, 5200 is also substantially the same as that for the channel-forming member 5000. The channel-forming members 5100, 5200 do not need to be provided as separate pieces, but may also be formed integrally with another member, for example, a separator or the like.

Figure 19:
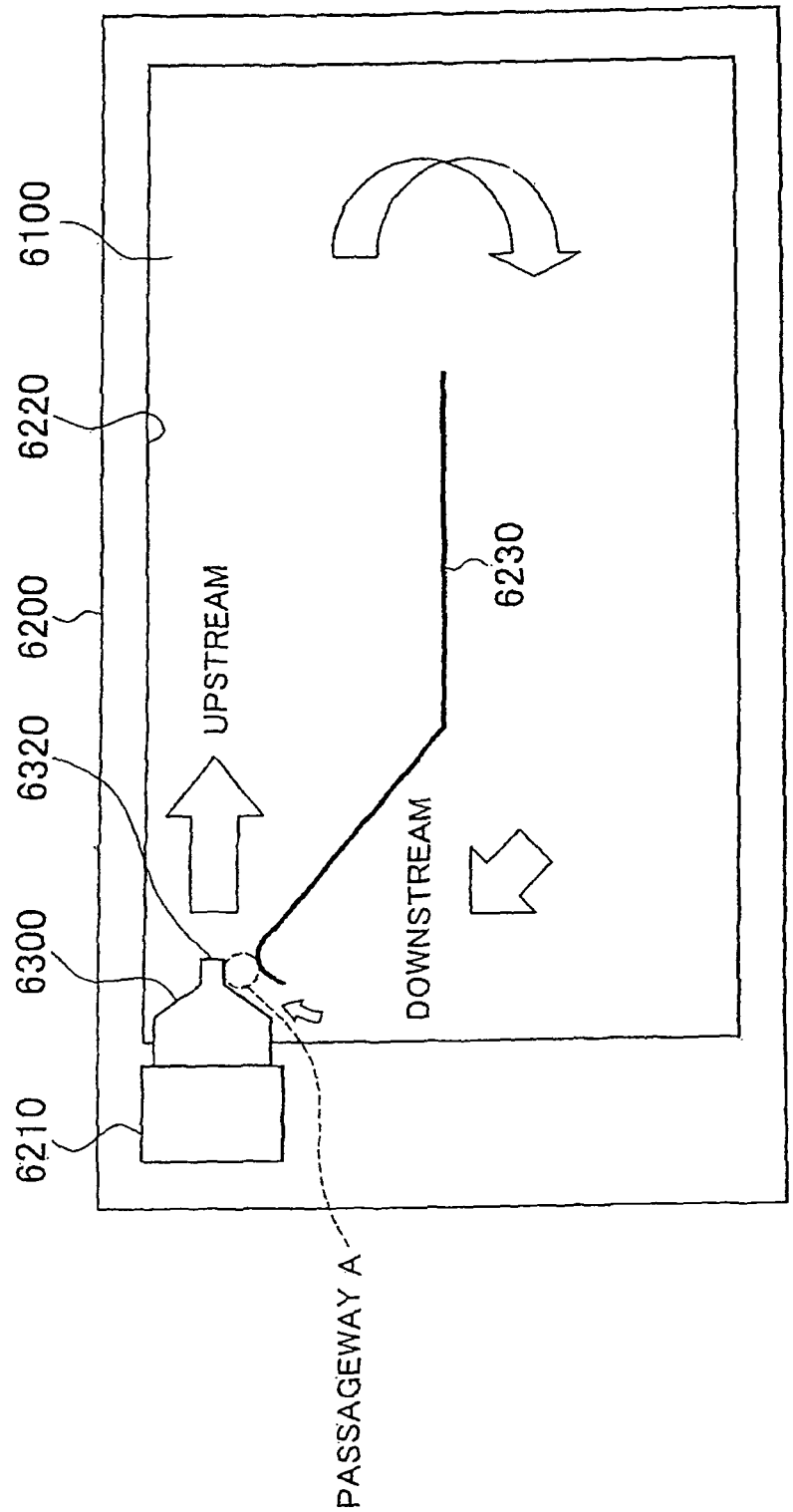
FIG. 19 is an illustrative diagram schematically showing an internal construction of a circulation type fuel cell 6000 as a modification of the form of supplying the fuel gas.

MODIFICATION 11: FIG. 19 is an illustrative diagram schematically showing an internal construction of a circulation path type fuel cell 6000, as a modification of the form of supplying the fuel gas. As shown in FIG. 19, in the fuel cell 6000 of this modification, an anode-side separator 6200 is provided with a recess portion 6220 that forms a fuel gas channel, a fuel gas inlet port 6210, and a restriction plate 6230. The recess portion 6220 that forms a fuel gas channel is formed entirely in a region of the anode-side separator 6200 that faces an anode 6100 of a membrane electrode assembly. A nozzle 6300 is attached to the fuel gas inlet port 6210 of the anode-side separator 6200 so that the nozzle 6300 can jet the fuel gas toward the recess portion 6220. As the fuel gas is jetted from the nozzle 6300, the fuel gas is supplied from the fuel gas inlet port 6210 into the recess portion 6220. The restriction plate 6230 is a member that restricts the flowing direction of the fuel gas, and stands from a bottom surface of the recess portion 6220, extending from the vicinity of the nozzle 6300 to a neighborhood of the center of the recess portion 6220. An end portion of the restriction plate 6230 that is close to the nozzle 6300 is curved in conformation with the shape of a side surface of the nozzle 6300, and a passageway A is defined between the end portion of the restriction plate 6230 and the nozzle 6300.

Figure 20:
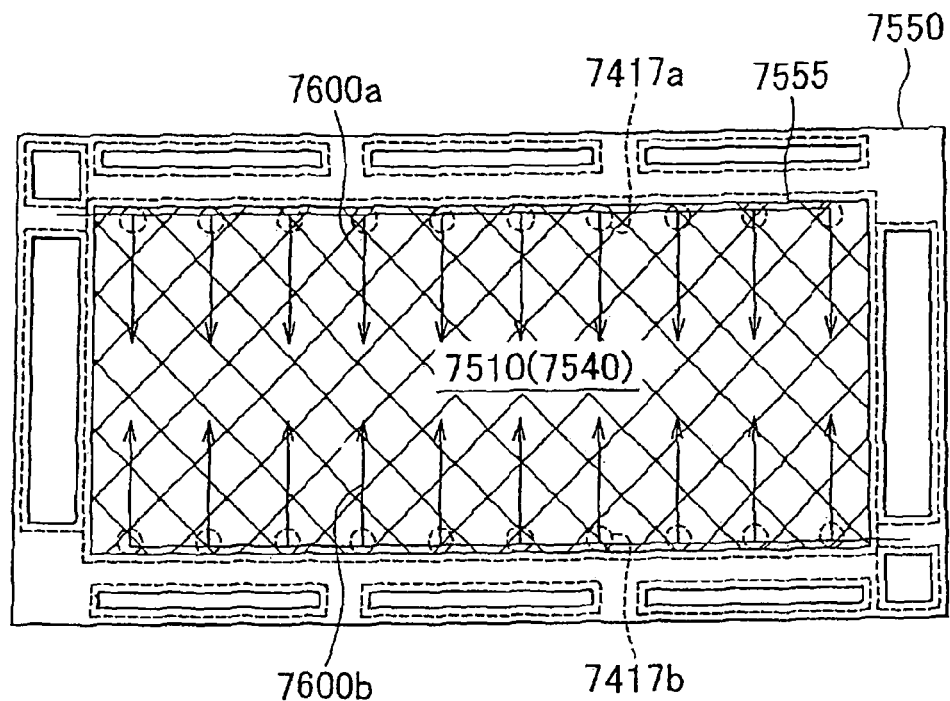
FIG. 20 is an illustrative diagram illustrating the flow of the fuel gas in Modification 12.

In this fuel cell 6000, when the fuel gas supplied from the fuel gas inlet port 6210 is injected from an injection hole 6320 of the nozzle 6300 into a fuel gas channel (the recess portion 6220), the fuel gas is restricted in the flowing direction by the inner-side walls of the recess portion 6220 of the anode-side separator 6200 and by the restriction plate 6230, so that the fuel gas flows from the upstream side to the downstream side along the surface of the anode 6100, as shown by hollow arrows in FIG. 20. At this time, due to the ejector effect brought about by the high-speed fuel gas jetted from the nozzle 6300, a fluid containing an impurity gas and the fuel gas on the downstream side is drawn through a gap (passageway A) that is provided between the nozzle 6300 and the end portion of the restriction plate 6230, and is circulated to the upstream side. In this manner, the residence of the fluid in the fuel gas channel and on the surface of the anode 6100 can be restrained.

Incidentally, although in the fuel cell 6000 of the foregoing modification, the fluid is circulated in directions along the surface of the anode 6100 by utilizing the ejector effect, any other construction may also be employed as long as the construction allows the fluid to be circulated in directions along the surface of the anode within the fuel cell. For example, in the fuel cell 6000, a straightening vane may be provided at a site that can form a fuel gas channel, such as a site in the surface of the anode 6100, the anode-side separator 6200, etc., instead of the nozzle 6300 or the restriction plate 6230, and the fluid may be circulated in directions along the surface of the anode 6100 by this straightening vane and the flow of the fuel gas. Alternatively, a small actuator (e.g., a micromachine) may be incorporated along a circulation path in a gas channel, such as the recess portion 6220 or the like, to form a structure that causes the fuel gas to circulate. Furthermore, a construction in which a temperature difference is provided within the recess portion 6220 and the convection is utilized to cause the circulation is also conceivable.

Figure 21:
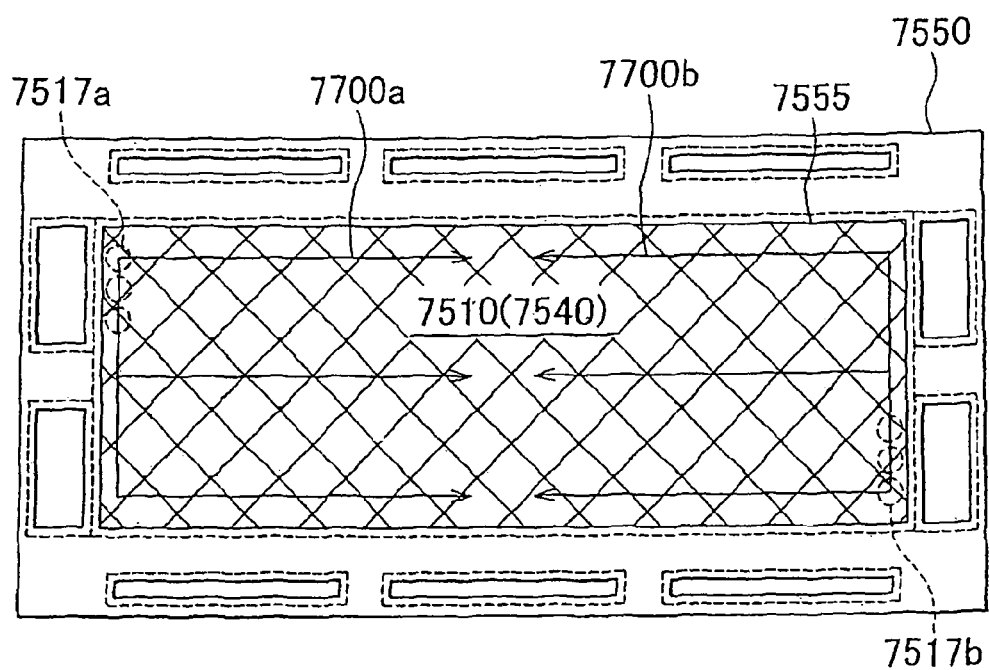
FIG. 21 is an illustrative diagram illustrating the flow of the fuel gas in Modification 13.
Figure 22:
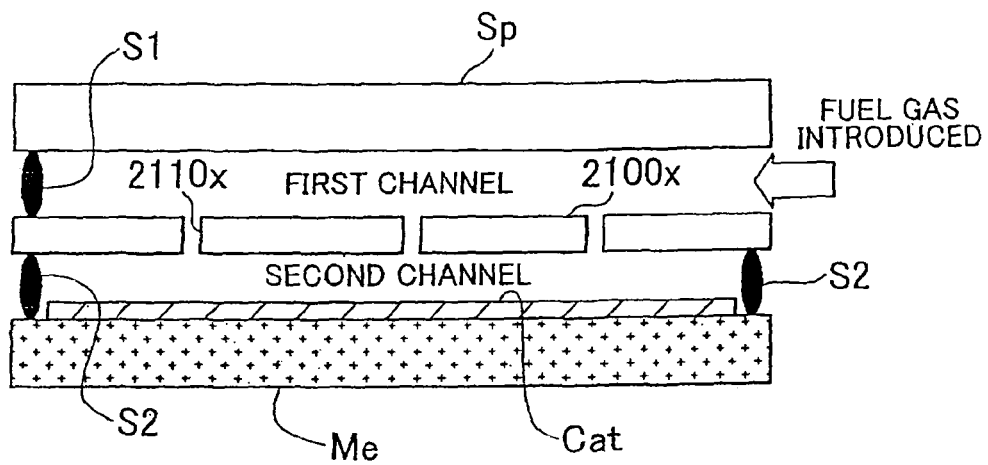
FIG. 22 is an illustrative diagram showing an example construction of a fuel cell.
Figure 23:
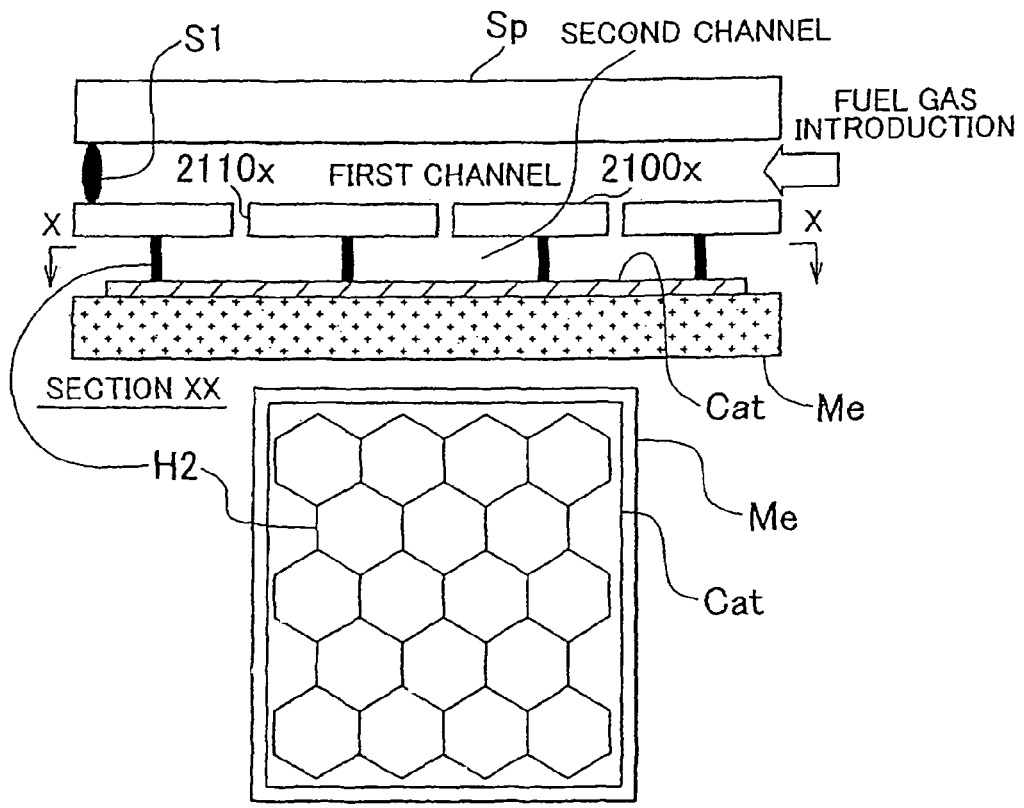
FIG. 23 is an illustrative diagram showing an example construction of a fuel cell.

MODIFICATIONS 12, 13: Modification 12 and Modification 13 of the foregoing embodiments will be described with reference to FIGS. 20 and 21. FIG. 20 is an illustrative diagram illustrating flows of the fuel gas as Modification 12. FIG. 21 is an illustrative diagram illustrating flows of the fuel gas as Modification 13. Firstly, constructions common between the two modifications will be described. In the two fuel cells of Modifications 12, 13, the electricity generation body includes a frame 7550, a membrane-electrode-gas diffusion layer assembly (MEGA) 7510, and a porous body 7540. A central portion of the frame 7550 is provided with an opening portion 7555 to fit the MEGA 7510 in, and the MEGA 7510 is disposed so as to cover the opening portion 7555. The porous body 7540 is disposed on the MEGA 7510. Besides, a plurality of penetration holes through which the fuel gas, air or a cooling water passes are provided in an outer peripheral portion of the frame 7550, which is the same as in the foregoing embodiments.

Modification 12 and Modification 13 are substantially the same in the foregoing overall structure, and are also the same in that the fuel gas is supplied via an anode-facing plate (not shown). Modification 12 and Modification 13 are different in the direction of the supply of the fuel to the porous body 7540. In Modification 12, a row of fuel gas supply openings 7417*a* for supplying the fuel gas to the porous body 7540 is provided in the vicinity of a long side edge portion, among the outer edge portions of the opening portion 7555 of the frame 7550, and another row of fuel gas supply openings 7417*b* is disposed in the vicinity of the other long side edge that is opposite to the foregoing long side edge. On the other hand, Modification 13, as shown in FIG. 21, fuel gas supply openings 7517*a* and fuel gas supply openings 7517*b* are disposed adjacent to two opposite short sides of the opening portion 7555, respectively.

In Modification 12, the fuel gas passes through the fuel gas supply openings 7417*a* or the fuel gas supply openings 7417*b* into the porous body 7540, and is supplied in the porous body 7540 from the long side end portion sides toward a middle portion of the porous body 7540, that is, in the direction of arrows 7600*a* (from up to down in FIG. 20) or in the direction of arrows 7600*b* (from down to up in FIG. 20). Thus, the fuel gas supplied into the porous body 7540 through the fuel gas supply openings 7417*a* and the fuel gas supplied into the porous body 7540 through the fuel gas supply openings 7417*b* collide and mix with each other near the middle portion of the module. On the other hand, in Modification 13, the fuel gas passes through the fuel gas supply openings 7517*a* or the fuel gas supply openings 7517*b* into the porous body 7540, and flows in the porous body 7540 from the short side end portion sides toward a middle portion of the porous body 7540, that is, in the direction of arrows 7700*a* (from left to right in FIG. 21) and in the direction of arrows 7700*b* (from right to left in FIG. 21). In Modification 13, too, the fuel gas supplied into the porous body 7540 through the fuel gas supply openings 7517*a* and the fuel gas supplied into the porous body 7540 through the fuel gas supply openings 7517*b* collide and mix with each other near the middle portion of the module.

According to Modifications 12, 13 described above, the fuel gas is supplied to the porous body 7540 in two opposite directions from the fuel gas supply openings 7417*a* and the fuel gas supply openings 7417*b* (or the fuel gas supply openings 7517*a* and the fuel gas supply openings 7517*b*) that are provided near two opposite side end portions of the porous body 7540. The opposing flows of the fuel gas thus supplied collide and mix with each other in a middle portion of the porous body 7540. Therefore, an advantage of the impurities, such as nitrogen gas or the like, being unlikely to localize can be achieved. Hence, the electricity generation efficiency of the fuel cell can be improved. Also, since the fuel gas is supplied from two opposite sides, an advantage of the distribution of the fuel gas being restrained from deviating from a desired one within the porous body 7540 can be achieved. Incidentally, although Modifications 12, 13 employ a porous body as the fuel gas channel, the fuel gas channel is not limited to a porous body, but various other supply methods described below may be used.

MODIFICATION 14: Although in conjunction with in the fuel cells of the foregoing embodiments, detailed description of the internal structure thereof is omitted, the anode-side fuel gas supply channel and the cathode-side oxidant gas supply channel are each formed by a single layer of a metal porous body. However, the constructions of the fuel gas supply channel and the oxidant gas supply path are not limited to this form. For example, the fuel gas supply channel or the oxidant gas supply channel may also be formed in a straight shape or a serpentine shape by using ribs formed in the separators, or may also be formed by using a plurality of dimples. This will allow the fuel gas supply channel or the oxidant gas supply channel to be formed in a simple construction. It suffices that appropriate ones of these forms or constructions be adopted in accordance with the overall construction of the fuel cell, the conditions of use, etc.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:
1. A fuel cell system comprising:
a fuel cell that includes an electricity generation body formed by joining an anode to a surface of an electrolyte membrane and joining a cathode to another surface of the electrolyte membrane and that generates electricity while a fuel gas supplied to the anode is not discharged to outside but resides inside;
a fuel gas supply portion that supplies the fuel gas to the anode;
an oxidant gas supply portion that supplies an oxidant gas containing oxygen and an impurity gas other than oxygen to the cathode, wherein amounts of the impurity gas supplied to the cathode is capable of permeating to the anode;
a cathode off-gas discharge portion that discharges a cathode off-gas that is an oxidant gas left unused for electricity generation in the cathode, to an outside of the fuel cell;
a requested-output input portion that inputs a requested output that is requested by a load;
an output control portion that controls output of the fuel cell based on the input requested output, wherein the output control portion controls the fuel gas supply portion, the oxidant gas supply portion and the cathode off-gas discharge portion based on the input requested output, and causes the fuel gas to be supplied to the anode, and causes the oxidant gas to be supplied to the cathode, and causes the cathode off-gas to be discharged from the cathode, and the output control portion restricts the output of the fuel cell to an output that is smaller than the requested output at a time of start-up of the fuel cell; and
a determination portion that determines whether or not a difference between a partial pressure of the impurity gas in the anode and a partial pressure of the impurity gas in the cathode is less than a predetermined value, wherein if it is determined by the determination portion that the difference between the partial pressure of the impurity gas in the anode and the partial pressure of the impurity gas in the cathode is less than the predetermined value, the output control portion lifts the restriction for the output of the fuel cell, and controls the output of the fuel cell according to the input requested output.

2. The fuel cell system according to claim 1, wherein the output control portion prohibits the output of the fuel cell at the time of start-up of the fuel cell.

3. The fuel cell system according to claim 1, wherein the determination portion determines whether or not the difference between a partial pressure of the impurity gas in the anode and a partial pressure of the impurity gas in the cathode is less than a predetermined value at a predetermined timing after the start-up of the fuel cell.

4. The fuel cell system according to claim 1, wherein the difference between the partial pressure of the impurity gas in the anode and the partial pressure of the impurity gas in the cathode being less than the predetermined value includes the partial pressures being in an equilibrium state.

5. The fuel cell system according to claim 3, further comprising:
an operation condition input portion that inputs an operation condition of the fuel cell that includes a condition of supply of the fuel gas at the time of start-up of the fuel cell;
a table storage portion that stores a table in which a correspondence relation between the operation condition and a time that elapses from the startup of the fuel cell until the difference between the partial pressure of the impurity gas in the anode and the partial pressure of the impurity gas in the cathode becomes less than the predetermined value; and a timer that measures an elapsed time following the start-up of the fuel cell,
wherein the determination portion determines whether or not the difference between the partial pressure of the impurity gas in the anode and the partial pressure of the impurity gas in the cathode is less than the predetermined value by setting the time that elapses until the difference between the partial pressure of the impurity gas in the anode and the partial pressure of the impurity gas in the cathode becomes less than the predetermined value, and by referring to the timer.

6. The fuel cell system according to claim 5, wherein the determination portion referring to the timer means comparing the elapsed time measured by the timer and the time that elapses until the difference between the partial pressures becomes less than the predetermined value.

7. The fuel cell system according to claim 5, wherein the condition of supply of the fuel gas includes at least one of a pressure of the fuel gas supplied and a temperature of the electricity generation body.

8. The fuel cell system according to claim 5, further comprising at least one of a pressure sensor that detects the pressure of the fuel gas supplied and a temperature sensor that detects the temperature of the electricity generation body.

9. The fuel cell system according to claim 5, wherein the operation condition further includes an electricity generation stop duration of the fuel cell, and the timer further measures the electricity generation stop duration, and the determination portion sets the time that elapses until the difference between the partial pressure of the impurity gas in the anode and the partial pressure of the impurity gas in the cathode becomes less than the predetermined value, by taking into account the electricity generation stop duration measured by the timer.

10. The fuel cell system according to claim 1, further comprising a concentration sensor that detects a concentration of the impurity gas or the fuel gas in the anode, wherein the determination portion determines whether or not the difference between the partial pressure of the impurity gas in the anode and the partial pressure of the impurity gas in the cathode is less than the predetermined value based on the concentration of the impurity gas or the fuel gas detected by the concentration sensor.

11. The fuel cell system according to claim 10, wherein the concentration sensor is provided in a region in which the impurity gas is likely to reside at the time of start-up of the fuel cell.

12. The fuel cell system according to claim 10, wherein the concentration sensor is provided in a downstream region in the anode that is in a flowing direction of the fuel gas.

13. The fuel cell system according to claim 3 claim 1 further comprising a voltage detection portion that detects a voltage between the anode and the cathode, wherein the determination portion determines whether or not the difference between the partial pressure of the impurity gas in the anode and the partial pressure of the impurity gas in the cathode is less than the predetermined value based on the voltage detected by the voltage detection portion.

14. A fuel cell system comprising:
a fuel cell that includes an electricity generation body formed by joining an anode to a surface of an electrolyte membrane and joining a cathode to another surface of the electrolyte membrane and that generates electricity while a fuel gas supplied to the anode is not discharged to outside but resides inside;

a fuel gas supply portion that supplies the fuel gas to the anode;

an oxidant gas supply portion that supplies an oxidant gas containing oxygen and an impurity gas other than oxygen to the cathode, wherein amounts of the impurity gas supplied to the cathode is capable of permeating to the anode; and an output control portion that, at a time of start-up of the fuel cell, controls output of the fuel cell after the fuel gas starts to be supplied from the fuel gas supply portion and until a predetermined condition in which a difference between a partial pressure of the impurity gas in the anode and a partial pressure of the impurity gas in the cathode is less than a predetermined value is satisfied.

15. The fuel cell system according to claim 1, wherein at the time of start-up of the fuel cell, supply of the fuel gas to the anode is performed prior to supply of the oxidant gas to the cathode.

16. A control method for a fuel cell system that includes a cell that includes an electricity generation body formed by joining an anode to a surface of an electrolyte membrane and joining a cathode to another surface of the electrolyte membrane and that generates electricity while a fuel gas supplied to the anode is not discharged to outside but resides inside, the control method comprising:

acquiring an requested output that is requested of the fuel cell; and supplying the fuel gas to the anode and supplying an oxidant gas containing oxygen and an impurity gas other than oxygen to the cathode, wherein amounts of the impurity gas supplied to the cathode is capable of permeating to the anode, based on the acquired requested output, and discharging a cathode off-gas that is an oxidant gas not having been used for electricity generation in the cathode, from the cathode to an outside of the fuel cell, and controlling the output of the fuel cell, wherein controlling the output of the fuel cell includes restricting the output of the fuel cell to an output that is smaller than the requested output, at the time of start-up of the fuel cell until a predetermined condition in which a difference between a partial pressure of the impurity gas in the anode and a partial pressure of the impurity gas in the cathode is less than a predetermined value is satisfied.

17. A control method for a fuel cell system that includes a cell that includes an electricity generation body formed by joining an anode to a surface of an electrolyte membrane and joining a cathode to another surface of the electrolyte membrane and that generates electricity while a fuel gas supplied to the anode is not discharged to outside but resides inside, the control method comprising:

supplying the fuel gas to the anode at a time of start-up of the fuel cell;

supplying an oxidant gas containing oxygen and an impurity gas other than oxygen to the cathode, wherein amounts of the impurity gas supplied to the cathode is capable of permeating to the anode; and restricting the output of the fuel cell after the fuel gas starts to be supplied and until a predetermined condition in which a difference between a partial pressure of the impurity gas in the anode and a partial pressure of the impurity gas in the cathode is less than a predetermined value is satisfied.

* * * * *